United States Patent [19]
Schmidt et al.

[11] Patent Number: 5,954,044
[45] Date of Patent: Sep. 21, 1999

[54] CONNECTOR FOR SECURING A CONDUIT TO A FLUID SOURCE

[75] Inventors: Franklin T. Schmidt, Mulvane, Kans.; Alain J. Huguet, Caliure et Cuire; Gerard A. Scremin, Bron, both of France; Randall L. May, Andover; Norris R. Long, Wichita, both of Kans.

[73] Assignee: The Coleman Company Inc., Wichita, Kans.

[21] Appl. No.: 08/905,797

[22] Filed: Aug. 12, 1997

Related U.S. Application Data

[63] Continuation-in-part of application No. 08/746,284, Nov. 7, 1996, Pat. No. 5,868,126, which is a continuation of application No. 08/695,424, Aug. 12, 1996, abandoned.

[51] Int. Cl.$^6$ ........................................................ F24C 5/20
[52] U.S. Cl. ............................ 126/38; 126/25 R; 126/40; 126/41 R; 126/52
[58] Field of Search ............................... 126/38, 40, 25 R, 126/41 R, 24, 52; 137/322, 318; 431/344

[56] References Cited

U.S. PATENT DOCUMENTS

| | | |
|---|---|---|
| 945,517 | 1/1910 | Goodwin . |
| 2,860,820 | 11/1958 | Falligant ................................. 222/82 |
| 3,041,089 | 6/1962 | Purves ..................................... 285/94 |
| 3,620,266 | 11/1971 | Ryder ..................................... 141/20 |

(List continued on next page.)

FOREIGN PATENT DOCUMENTS

| | | |
|---|---|---|
| 2 278 873 | 8/1988 | European Pat. Off. . |
| 946456 | 1/1995 | France . |
| 2 342 309 | 2/1974 | Germany . |
| 7-14284 | 7/1997 | Japan . |
| 2 262 156 | 6/1993 | United Kingdom . |
| 2 262 157 | 6/1993 | United Kingdom . |

OTHER PUBLICATIONS

MSR Rapid Fire™Isobutane Stove: Instruction Book (1994).
"Furthering the Quest for Fire", Peak 1 Brochure 100–069 5M/895 DL (1992).
"Comparison Chart", Sports Afield, Mar. 1992, pp. 93–94.
Epigas catalog page (1991).

(List continued on next page.)

*Primary Examiner*—Larry Jones
*Attorney, Agent, or Firm*—Kramer Levin Naftalis & Frankel LLP

[57] ABSTRACT

A connector is provided for securing a conduit to a fluid source, which source includes a noncircular cylindrical pedestal having a fluid source outlet extending therethrough and an annular groove surrounding the pedestal. The connector includes an inlet port engageable with the fluid source outlet and an outlet port in fluid communication with the inlet port and engageable with the conduit. A collet includes a base, and a plurality of fingers extending from the base substantially parallel to an axis of the inlet port, each finger being disposed a common radial distance from the axis of the inlet port and including a radially extending pawl spaced from the base. An annular cam has a noncircular cylindrical receptacle correspondingly engageable with the noncircular cylindrical pedestal of the fluid source and having an axis coincident with the axis of the inlet port. The cam is seated within the collet and disposed to rotate about the coincident axes, so that when the pedestal is engaged with the receptacle, rotation of the pedestal causes the cam to rotate. The cam includes a contact surface which, when the cam is rotated by rotation of the pedestal, abuts the fingers of the collet and forces the pawls away from the coincident axes into the annular groove to secure the conduit to the fluid source.

18 Claims, 29 Drawing Sheets

U.S. PATENT DOCUMENTS

| | | | |
|---|---|---|---|
| 3,900,281 | 8/1975 | Penberthy | 431/344 |
| 3,907,490 | 9/1975 | Schaller | 431/142 |
| 3,933,283 | 1/1976 | Hoagland | 222/402.13 |
| 4,082,993 | 4/1978 | Oakes | 137/322 |
| 4,092,974 | 6/1978 | Zenzaburo | 126/38 |
| 4,177,790 | 12/1979 | Zenzaburo | 126/38 |
| 4,305,180 | 12/1981 | Schwartz | 439/296 |
| 4,390,160 | 6/1983 | Reed | 251/149.6 |
| 4,487,469 | 12/1984 | Björk | 439/332 |
| 4,518,162 | 5/1985 | Oates | 482/93 |
| 4,815,541 | 3/1989 | Arrington | 169/74 |
| 4,865,292 | 9/1989 | Ekman | 251/149.6 |
| 4,904,182 | 2/1990 | Leshner | 431/354 |
| 5,065,735 | 11/1991 | Bourgeois et al. | 126/40 |
| 5,070,858 | 12/1991 | Wang | 126/38 |
| 5,111,838 | 5/1992 | Lanston | 137/223 |
| 5,213,309 | 5/1993 | Makishima | 251/149.6 |
| 5,280,876 | 1/1994 | Atkins | 251/149.1 |
| 5,330,154 | 7/1994 | Mashburn et al. | 251/144 |
| 5,370,527 | 12/1994 | Hefling et al. | 431/247 |
| 5,425,354 | 6/1995 | Park | 126/50 |
| 5,513,624 | 5/1996 | Vorhis | 126/38 |

OTHER PUBLICATIONS

Markmill catalog page (No Date).
Optimus catalog page (No Date).
Esbit/Gaskocher catalog page (No Date).
Leisuretime with Camping Gaz catalog (five pages) (1995).
KOK catalog page (1995).
Sabel, Steve, "Light Weight Stoves", *Off Belay Magazine,* 1973, pp. 6–26.
Peak 1 Micro Stove:Instructions for Use, Model 3140–700T, Aug. 1995.
Peak 1 Alpine Stove: Instructions for Use, Model 3093–700T, Aug. 1995.
Package for Peak 1 Stove Model 3140–700T (No Date).
Package for Peak 1 Stove Model 3093–700T (No Date).
MSR Whisper Lite: Operating Instructions (1994).
Japanese language catalog page (No Date).
Coleman LP Gas Picnic Stove, Model No. 5402, Advertising Literature, 1956.
Coleman LP Gas Lantern, Model No. 5101, Parts List, *Parts Catalog,* 1958.
Coleman LP Gas Stove and Lantern, Model Nos. 5403 and 5104, Catalog circa 1963.

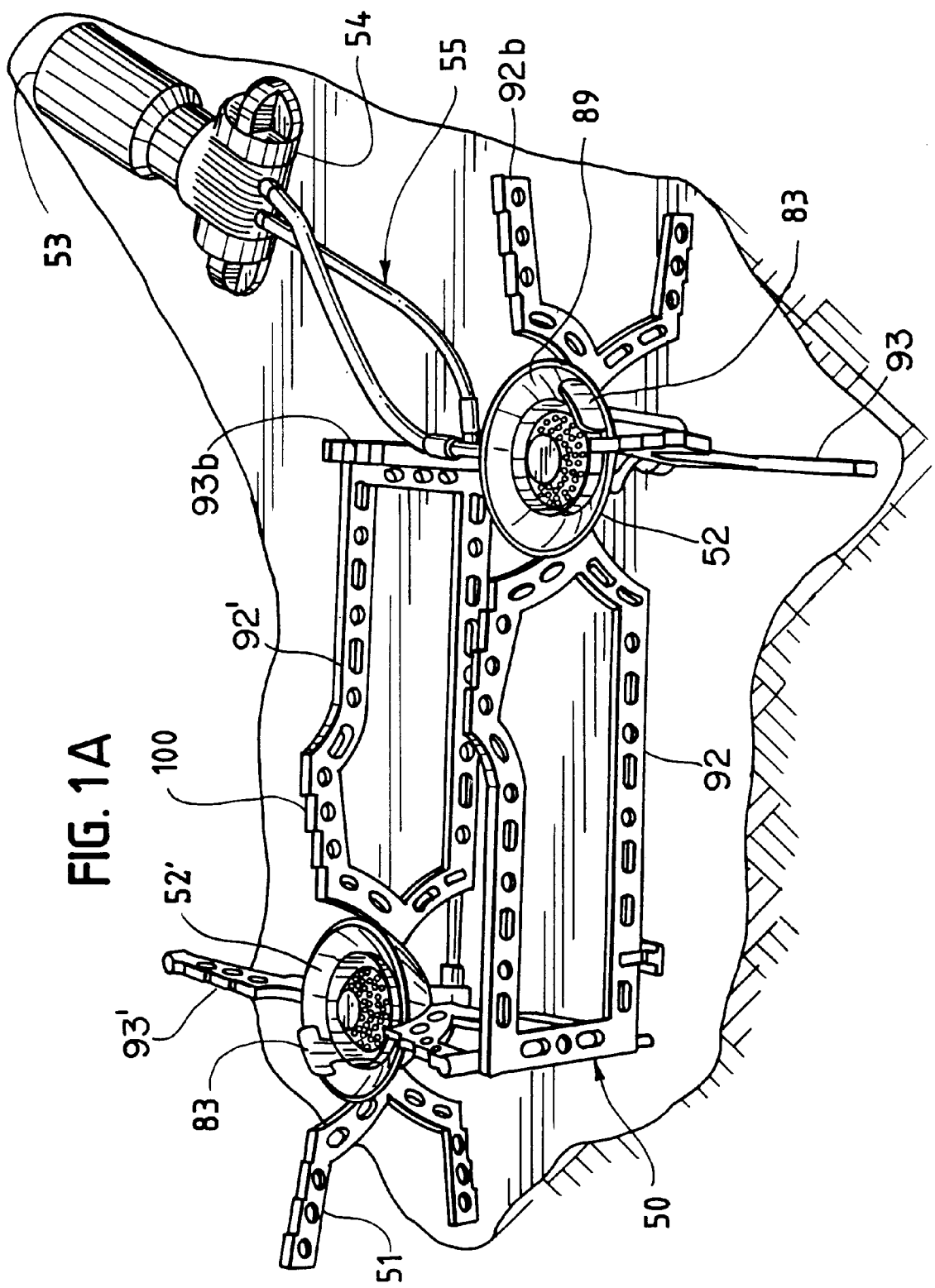

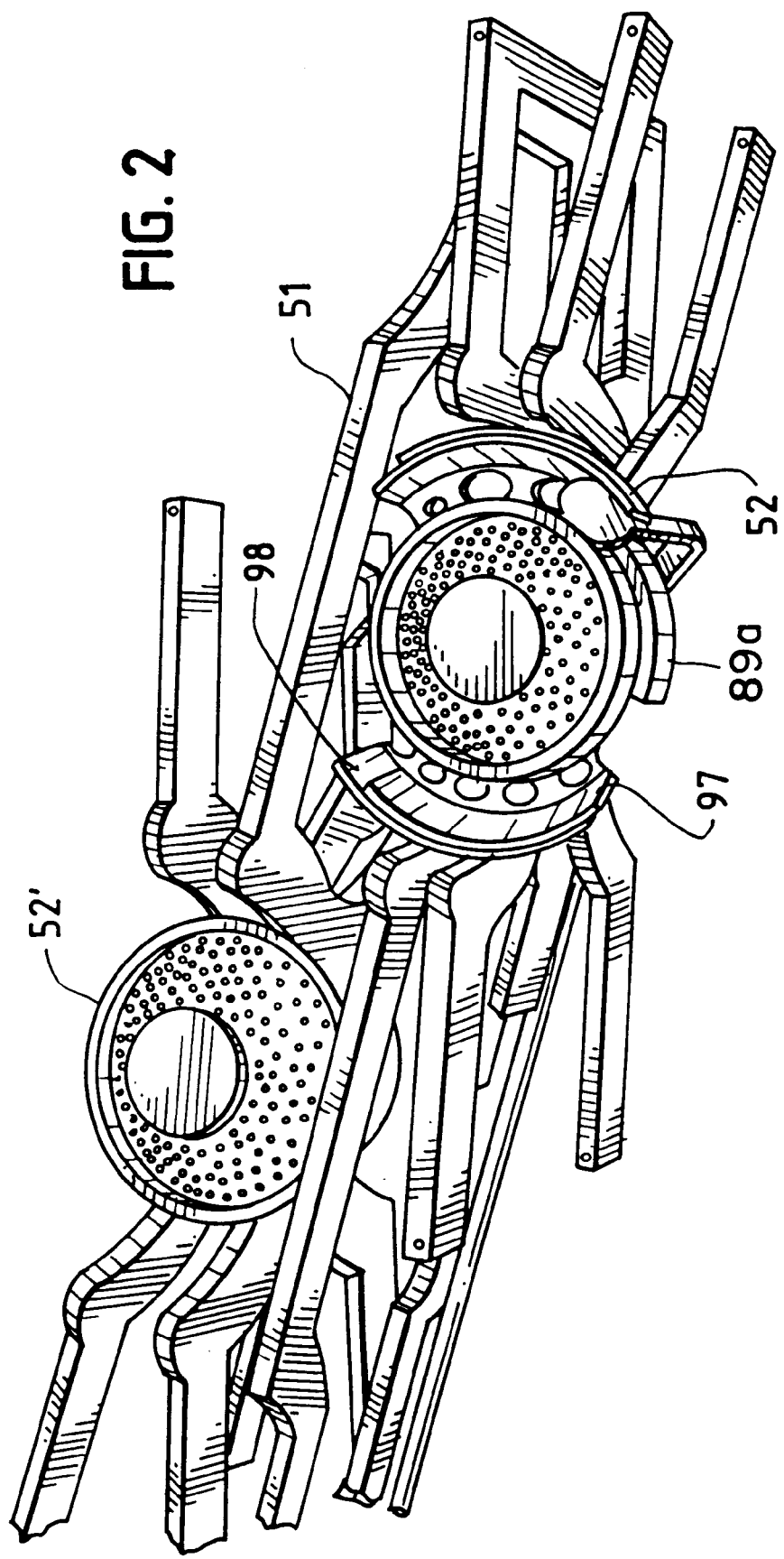

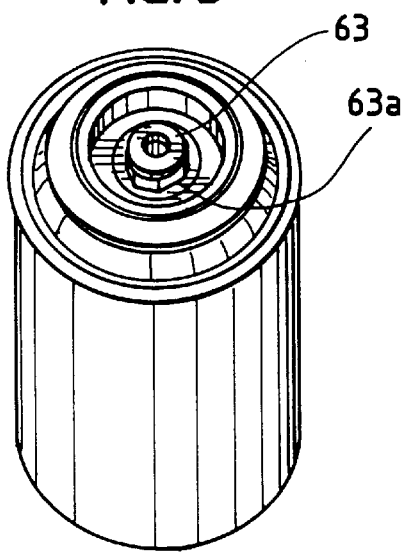
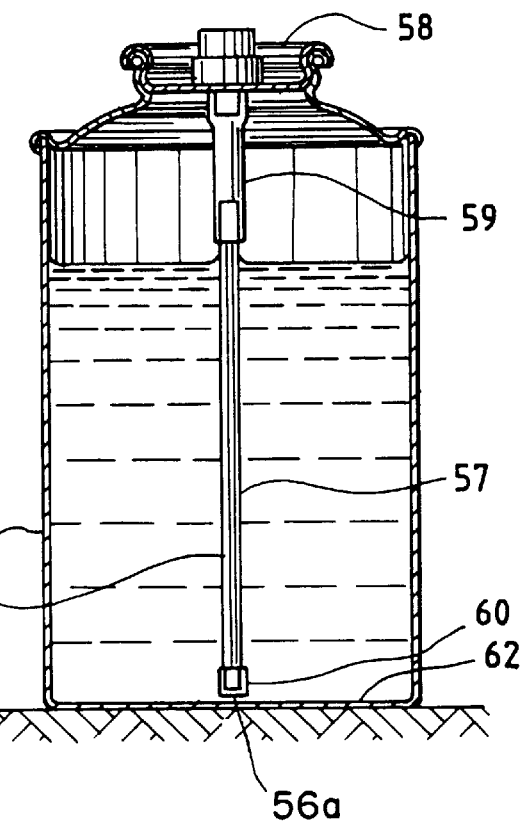
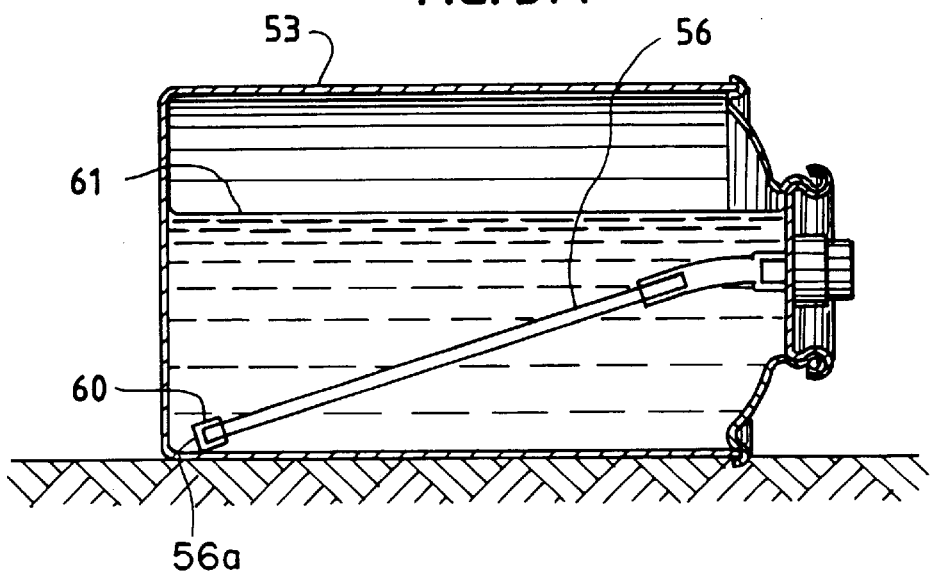

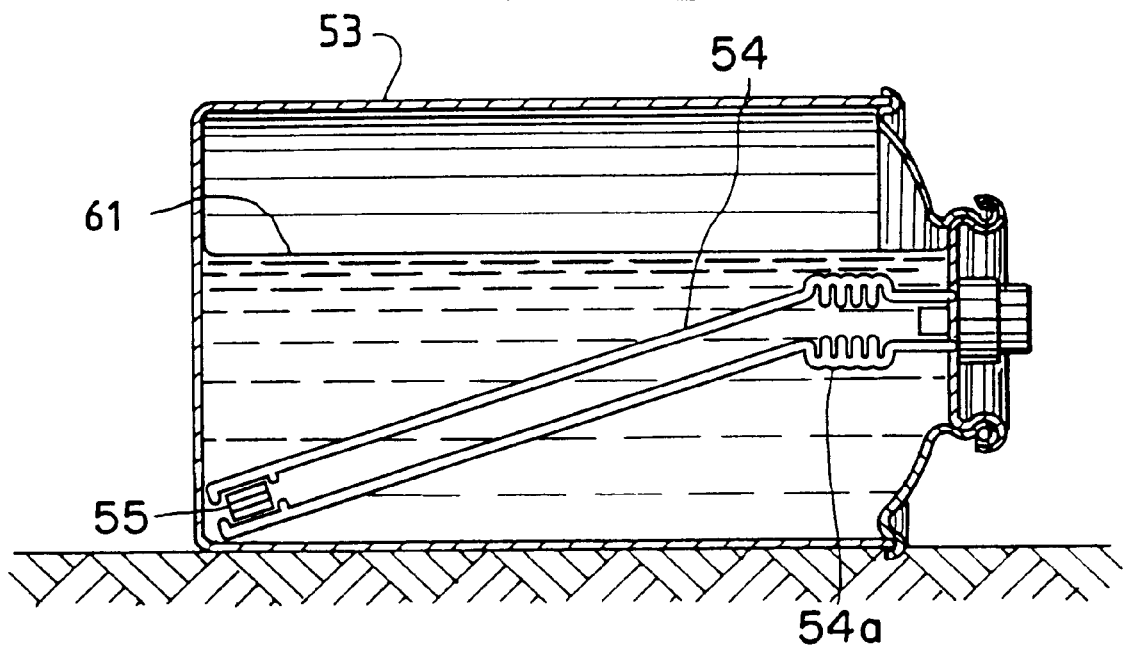

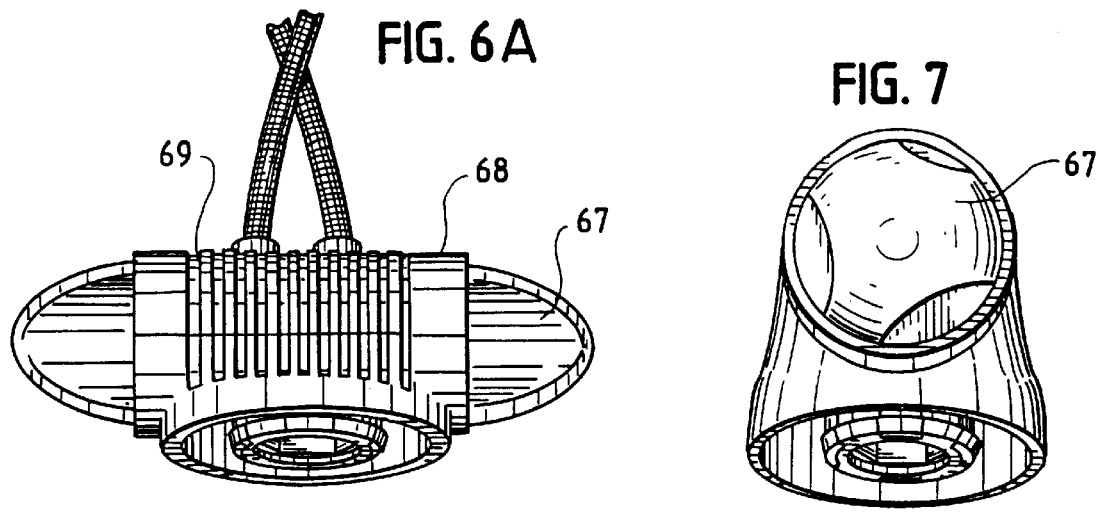
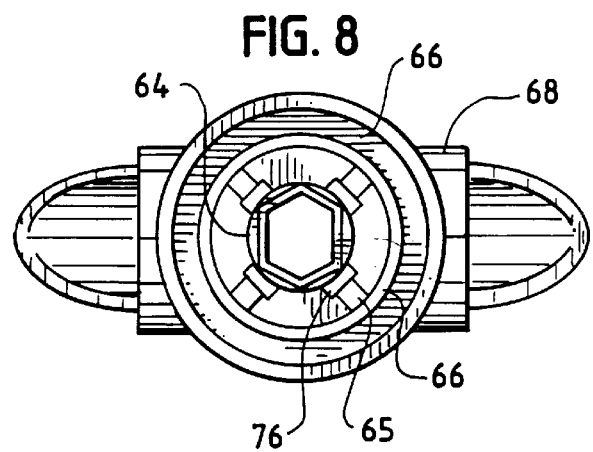
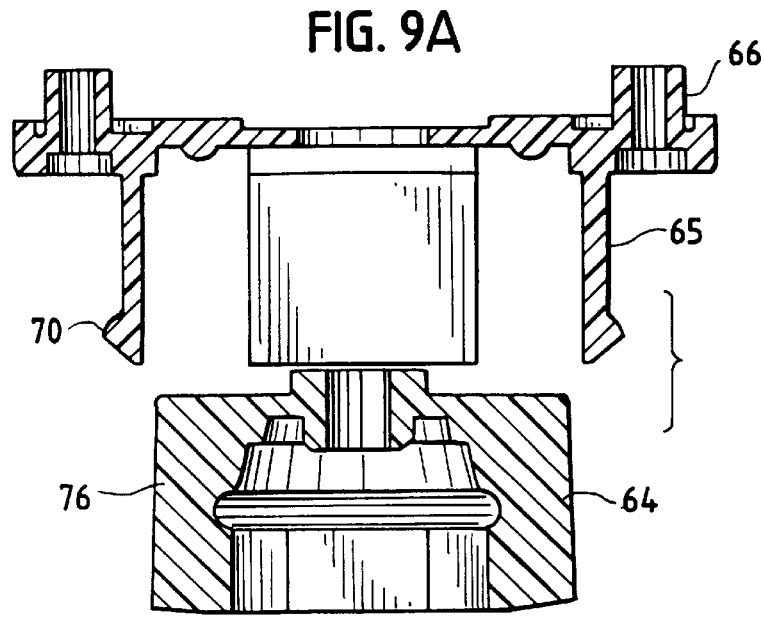

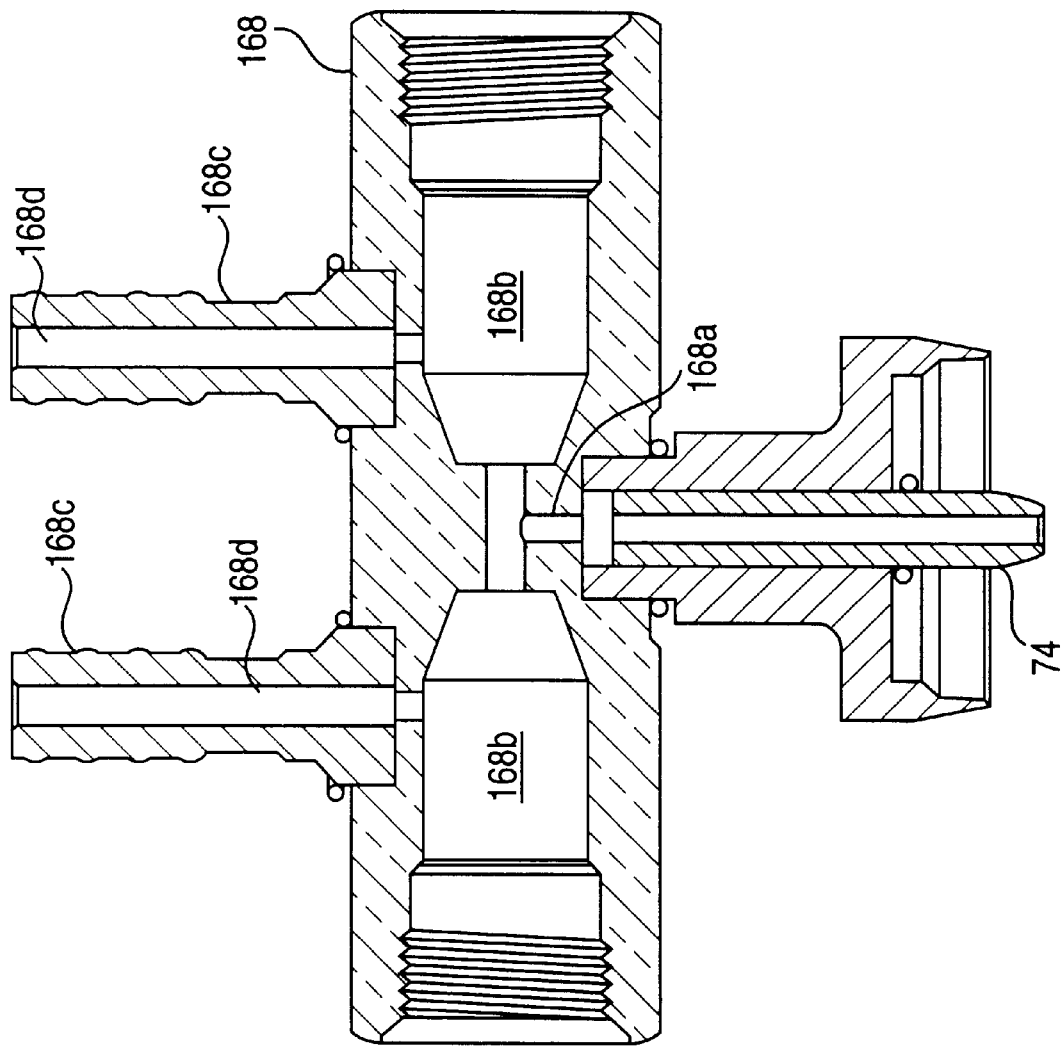

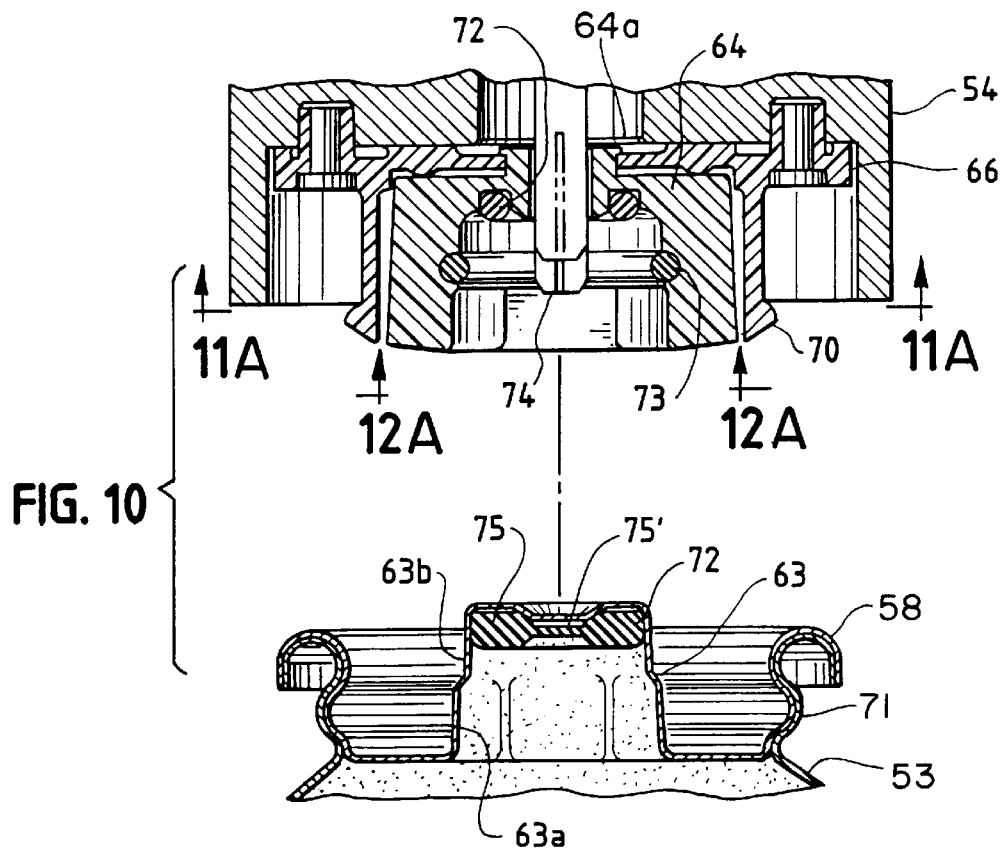
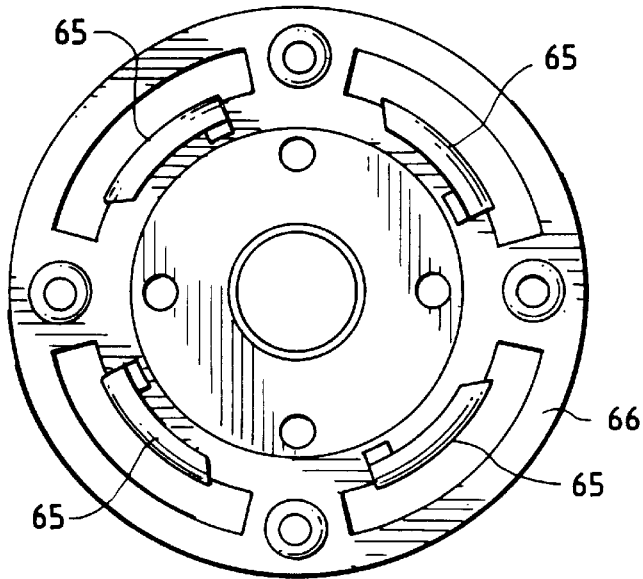
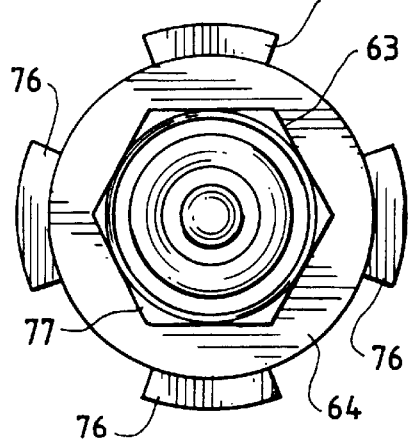

FIG. 11B
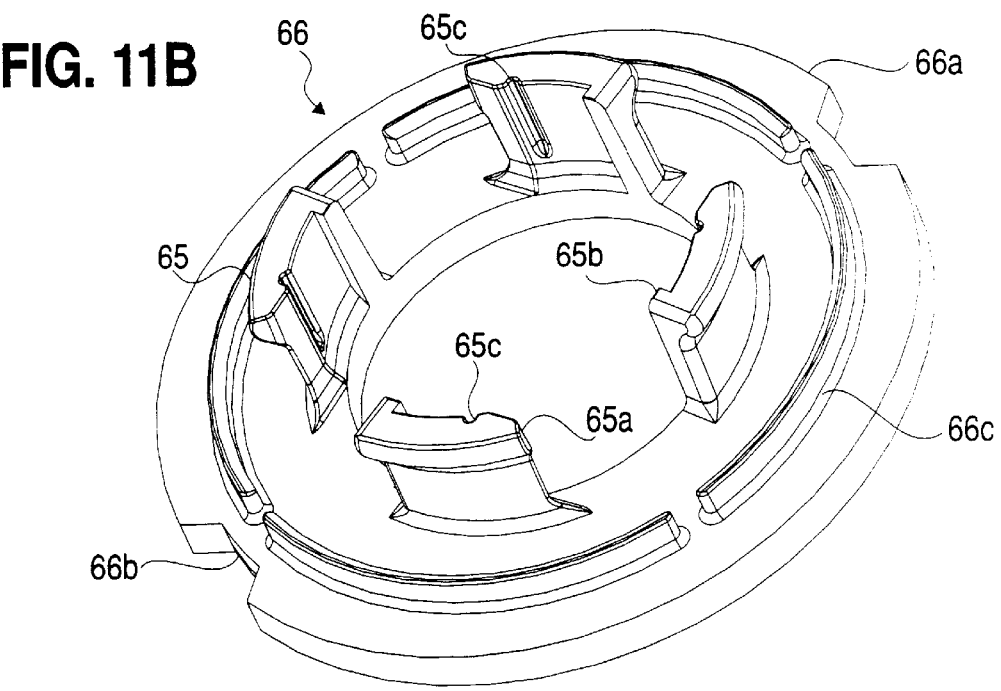
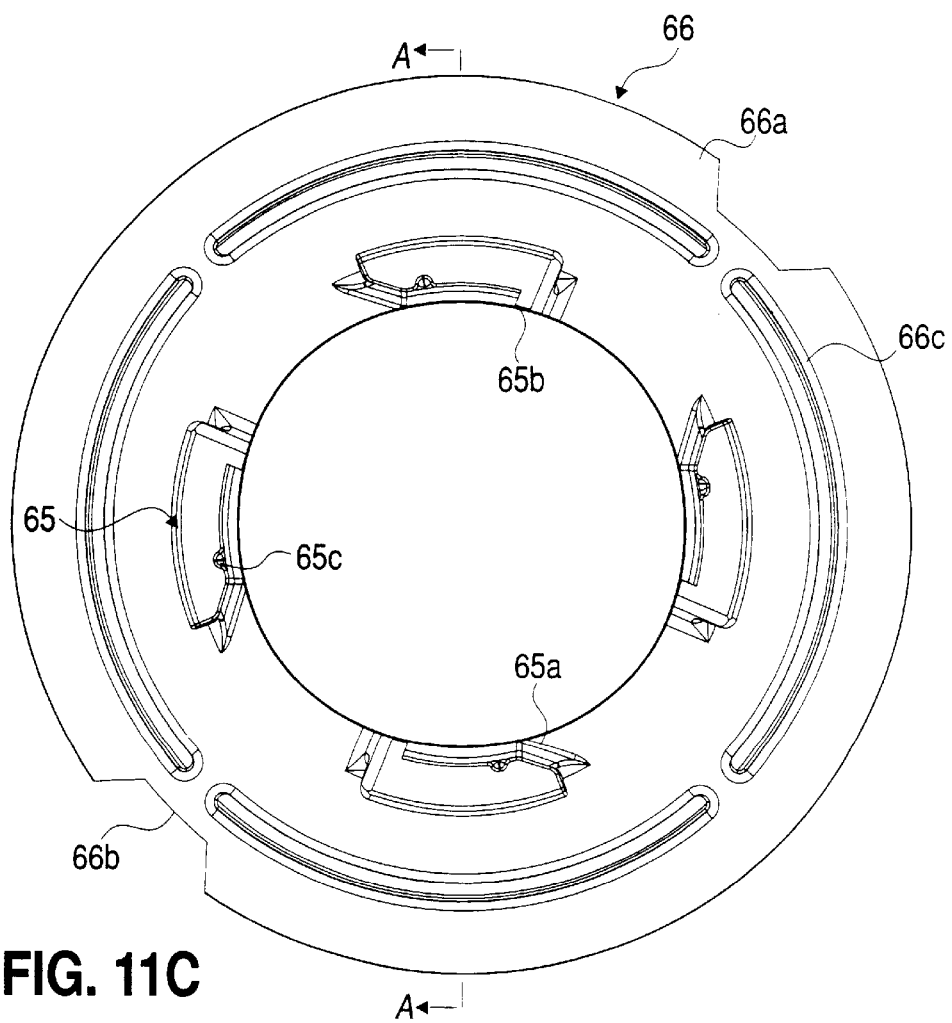
FIG. 11C

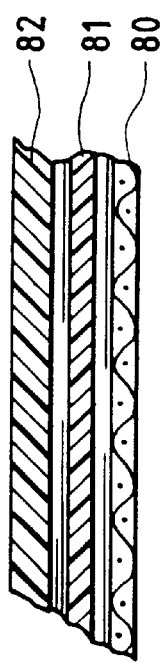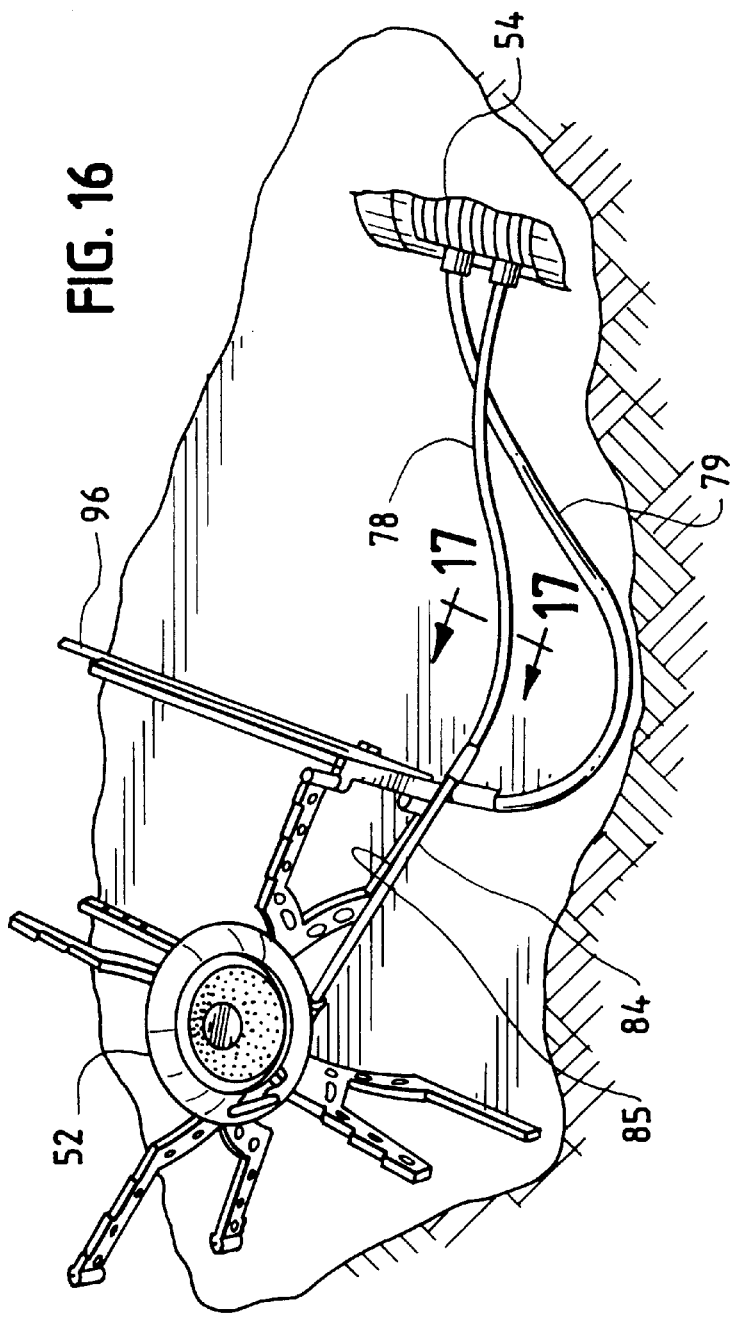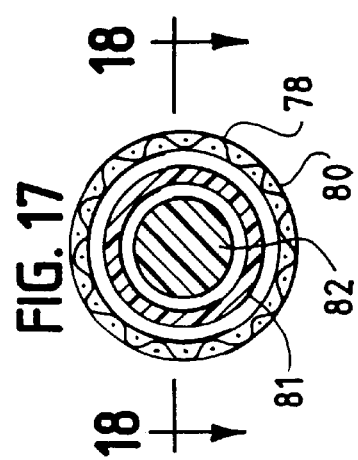

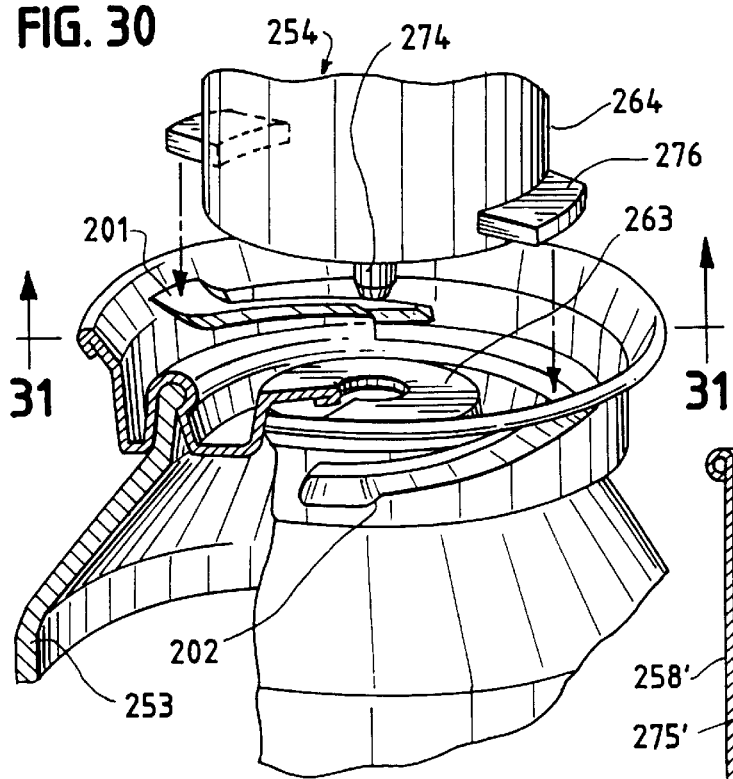
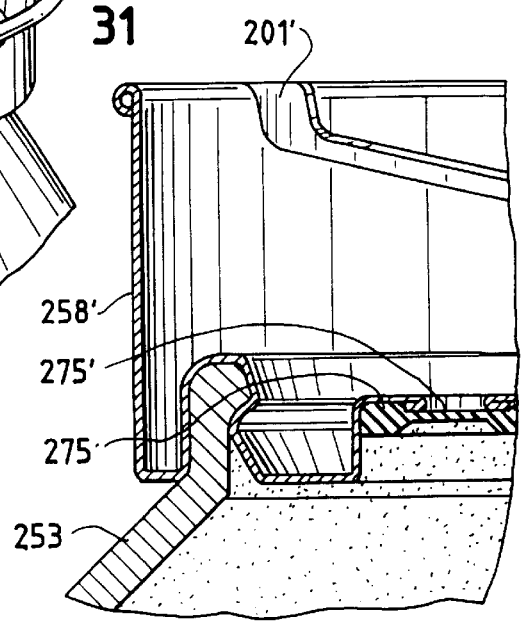
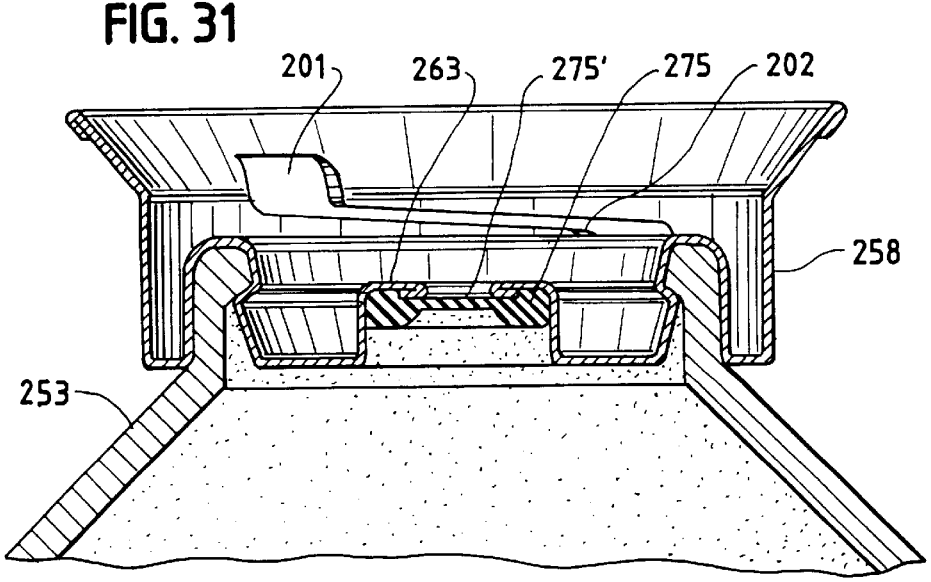

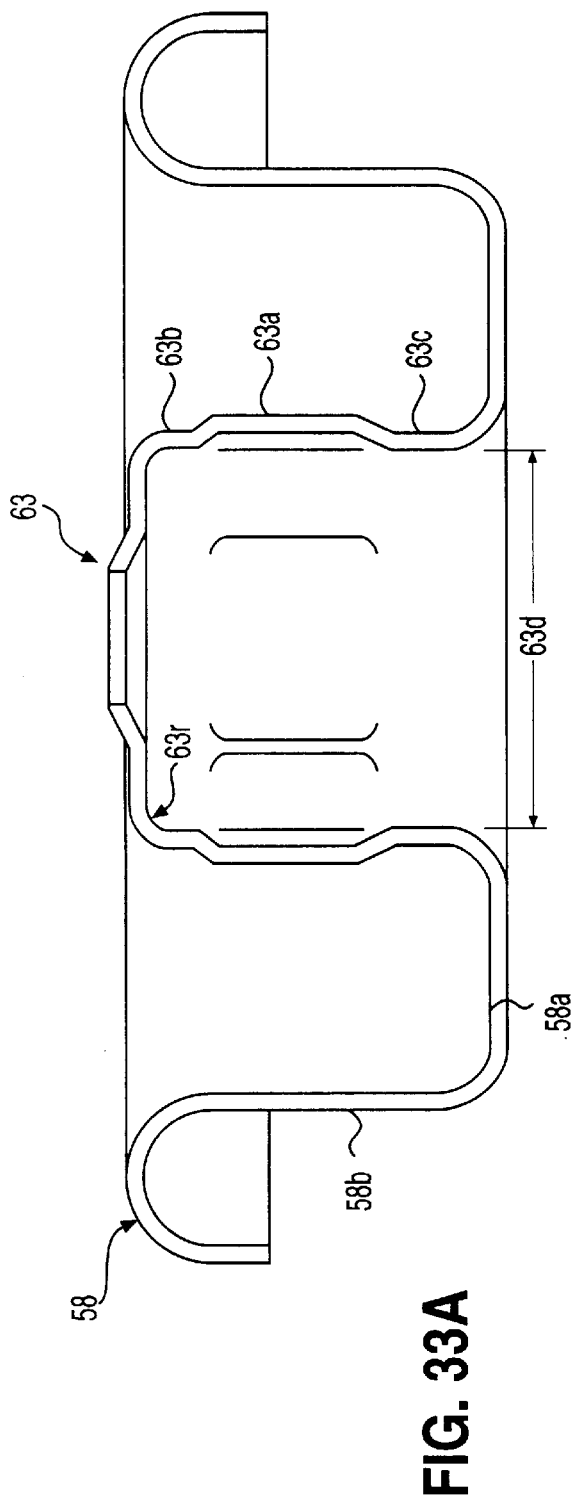
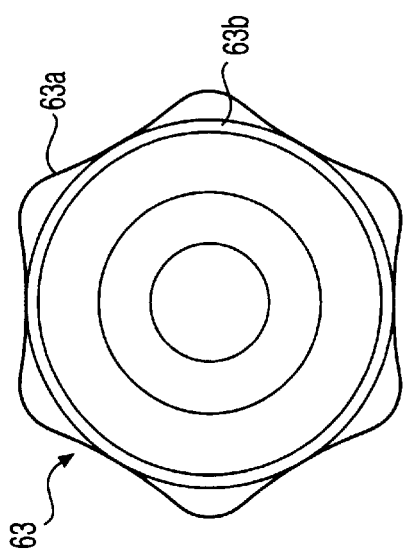
FIG. 33A
FIG. 33B

CONNECTOR FOR SECURING A CONDUIT TO A FLUID SOURCE

RELATED APPLICATION

This application is a continuation-in-part of U.S. patent application Ser. No. 08/746,284, filed Nov. 7, 1996, entitled "LPG CANISTER CONNECTOR FOR COMBUSTION APPLIANCE," now U.S. Pat. No. 5,868,126, Feb. 9, 1999, which is a continuation of U.S. patent application Ser. No. 08/695,424, filed Aug. 12, 1996, now abandoned.

FIELD OF THE INVENTION

The present invention relates to a connector, and more particularly to a connector for securing a conduit to a fluid source.

BACKGROUND OF THE INVENTION

Liquified petroleum gas (LPG) is generally utilized as a fuel or liquid which vaporizes at ambient pressures and temperatures, but which is stored in containers under pressure in liquid form. Most conventional burning appliances which utilize LPG are relatively simple, comprising a valve adapted to connect the pressurized LPG container to a burner. Most of these burning appliances operate on a vapor-withdrawal principle, drawing vapor from the container. The container is generally oriented so that the liquid settles to the bottom and the self-pressurized vapor collects at the top. The appliance draws this vapor from the container in order to fuel the burner.

While simple to operate, this type of burning appliance has several drawbacks. As the vapor is withdrawn, the pressure in the container will drop. Also, additional vapor will bubble from the remaining liquid in the container. As this occurs, the liquid will cool and the pressure in the container will drop further. As the pressure drops, so does the output of the burning appliance. In addition, if the fuel is a mixture of gases, such as a commonly used blend of propane and butane, these different components will bubble out of the liquid at different rates. Thus, the mixture of the gaseous components in the vapor will change, altering the performance of the appliance as it consumes the fuel. All of these factors, which are aggravated at low temperatures, result in inconsistent burner output.

Prior attempts to develop burning appliances, which operate on liquid-withdrawal principles generally involve a porous wick depending from a check valve within the container. The wick draws liquid fuel from the container, and the fuel is vaporized after it is extracted from the container. While these liquid withdrawal arrangements do not suffer from cold weather performance difficulties to the same extent as vapor withdrawal appliances, it is difficult to maintain a sufficient wicking rate to keep up with the output demands of many appliances, particularly at low fuel levels.

Thus, there is a need in the art for a pressurized LPG container which permits withdrawal of liquid fuel from the container, and from which liquid fuel can be withdrawn at an acceptable rate, regardless of fuel levels.

In order to withdraw liquid from a canister of a container using a dip tube, it is necessary that the dip tube be submersed in the liquid in the canister. This can be accomplished by orienting the canister. For example, the dip tube can be straight, and the canister can be designed to operated in the upright position. Alternatively, the dip tube can be designed to extend to a sidewall of the canister, and the canister can be designed to be oriented with the dip tube pointing down, to where the liquid will accumulate. However, these approaches require the canister orientation to be maintained, which can be burdensome in a camping setting.

Thus, there is a need in the art for a canister from which liquid can be withdrawn regardless of the canister orientation.

With liquid withdrawal, it is desired that the liquid fuel be properly vaporized before it reaches the burner. Thus, there is an additional need in the art for a connector between the fuel container and the burning appliance which assists in vaporizing the fuel.

Because campers and backpackers seek to minimize the volume, weight, and amount of equipment they carry, appliances such as camp stoves must be compact, lightweight, and versatile, yet easy to assemble and operate. It is therefore desirable to provide a compact, lightweight, and versatile portable stove.

U.S. Pat. No. 4,177,790 to Zenzaburo, for a "Pocket Camp Stove", discusses one such approach, in which a stove has three wire legs attached to a hub. The three legs are movable between a folded position, in which all three legs are relatively together, and an in-use position, in which the three legs are substantially equally spaced apart and extend radially outwardly from the hub member. Although this stove is compact and lightweight, the independently movable legs can be awkward to manipulate and unstable if not properly oriented.

Thus, there is a need in the art for a stove frame which not only is compact, lightweight, and versatile but which also is stable and simple to operate.

It is often challenging to achieve a proper fuel flow to a burning appliance during start-up. Often, the flow rates will be set too high or low for proper ignition. It is difficult to gauge from sight or sound exactly how far a valve should be opened prior to ignition. Therefore, it is desirable to provide a mechanism by which the fuel flow rate can be properly controlled during start-up.

It is also desirable to provide a quick and simple mechanism for securing a container to a burning appliance. One attempt, Iwaniti's CB-55E stove, connects the canister by providing a notch in an extended rim of the canister cap. This notch matches a lever on the stove adjacent the valve mechanism. In order to engage the canister to the stove, the canister has to be oriented so that the lever fits within the notch. Once engaged, turning the canister actuates the lever, which, in turn, actuates a revolving collet. Within the collet sits a stationary cam. As the collet revolves, it contacts the cam, which forces fingers of the collet into a groove in the canister cap, securing the canister to the stove.

While such a mechanism provides a secure connection between the canister and the stove, it requires the canister to be oriented properly for engagement. It also requires that the canister include an extended canister rim, which increases the overall size of the canister.

Thus, there is a need in the art for a connector which permits a simple mechanism for securing a canister to a burning appliance or other outlet, and which does not require considerable effort to orient prior to connection, and which does not increase the overall size of the canister.

SUMMARY OF THE INVENTION

In one aspect, the present invention relates to a connector for securing a conduit to a fluid source, which source includes a noncircular cylindrical pedestal having a fluid source outlet extending therethrough and an annular groove surrounding the pedestal. The connector includes an inlet port engageable with the fluid source outlet and an outlet port in fluid communication with the inlet port and engageable with the conduit. A collet includes a base and a plurality of fingers extending from the base substantially parallel to an axis of the inlet port, each finger being disposed a common radial distance from the axis of the inlet port and including a radially extending pawl spaced from the base. An annular cam has a noncircular cylindrical receptacle correspondingly engageable with the noncircular cylindrical pedestal of the fluid source and having an axis coincident with the axis of the inlet port. The cam is seated within the collet and disposed to rotate about the coincident axes, so that when the pedestal is engaged with the receptacle, rotation of the pedestal causes the cam to rotate. The cam includes a contact surface which, when the cam is rotated by rotation of the pedestal, abuts the fingers of the collet and forces the pawls away from the coincident axes into the annular groove to secure the conduit to the fluid source.

In another aspect, the present invention relates to a connector for securing a conduit to a fluid source, which source includes a pedestal having a fluid source outlet extending therethrough and a cap having an inwardly formed annular groove surrounding the pedestal. The connector includes an inlet port engageable with the fluid source outlet and an outlet port in fluid communication with the inlet port and engageable with the conduit. A collet adapted to be received within the cap includes a base and a plurality of fingers extending from the base substantially parallel to an axis of the inlet port, each finger being disposed a common radial distance from the axis of the inlet port and including a slot formed on an inside perimeter surface of each of the fingers and an annular rib formed on an outside perimeter surface of each of the fingers, the rib being received in the annular groove. An annular cam has a receptacle correspondingly engageable with the pedestal of the fluid source and having an axis coincident with the axis of the inlet port. The cam is seated within the collet and disposed to rotate about the coincident axes, so that when the pedestal is engaged with the receptacle, rotation of the pedestal causes the cam to rotate. The cam includes a plurality of spaced projections formed on an outside perimeter surface of the cam, wherein when the cam is rotated by rotation of the pedestal, each of the plurality of projections enters a respective one of the slots formed in the collet and forces the ribs into the annular grooves to secure the conduit to the fluid source.

In yet another aspect, the present invention relates to a method of securing a pedestal to a cam/collet mechanism. The method includes the steps of inserting a noncircular, cylindrical pedestal into a noncircular, cylindrical receptacle of an annular cam and rotating simultaneously the pedestal and the cam relative to a collet in which the cam is seated so that the cam forces a plurality of pawls on the collet into an annular groove surrounding the pedestal to secure the pedestal to the cam/collet mechanism.

In still another aspect, the present invention relates to a method of securing a pedestal to a cam/collet mechanism. The method includes the steps of inserting a hexagonal cylindrical pedestal into a hexagonal cylindrical receptacle of an annular cam and rotating simultaneously the pedestal and the cam relative to a collet in which the cam is seated so that a plurality of lugs on the cam abut against a plurality of fingers on the collet forcing a pawl on each finger into an annular groove surrounding the pedestal to secure the pedestal to the cam/collet mechanism.

These and other aspects, features, and advantages of the invention can be better appreciated with reference to the following drawings, in which like reference numerals and reference characters refer to like elements throughout.

BRIEF DESCRIPTION OF THE DRAWINGS:

The invention is described in conjunction with the accompanying drawings, in which:

FIG. 1A is a perspective view of an embodiment of the invention as applied to a portable camp stove;

FIG. 2 is a fragmentary perspective view of a collapsed stove similar to that seen in FIG. 1A, a difference being in the burner cap wind screen construction—unitary in FIG. 1A but segmented in FIG. 2;

FIG. 3 is a perspective view of an aerosol-type canister used in the present invention to contain liquified petroleum gas fuel;

FIG. 4 is a sectional view of the canister of FIG. 3 and illustrates the inventive dip tube when the canister is in a normal, stored condition;

FIG. 5A is another sectional view of the canister of FIG. 3 but showing the disposition of the dip tube when the canister is disposed horizontally as may be the case in operating the camp stove;

FIG. 5B is another sectional view of the canister of FIG. 3 but showing the disposition of another embodiment of the dip tube when the canister is disposed horizontally;

FIG. 6A is a fragmentary perspective view of the valve assembly of FIG. 1A;

FIG. 6C is a sectional view of an embodiment of a valve body of the valve assembly shown in FIG. 6B;

FIG. 7 is another perspective view of the valve assembly of FIG. 6A through 6D;

FIG. 8 is another perspective view of the valve assembly of FIG. 1A but taken essentially at right angles to the views of FIGS. 6A and 7;

FIG. 9A is an exploded sectional view of the camming members of the valve assembly as also seen particularly in the central portions of FIGS. 6A, 7, and 8;

FIG. 10 is a fragmentary exploded sectional view of the valve assembly and canister of FIG. 9A;

FIG. 11A is a bottom plan view of the collet portion of the valve assembly as would be seen along the sight line 11A—11A as applied to FIG. 10;

FIG. 11B is a perspective view of an embodiment of the collet of the present invention;

FIG. 11C is a front plan view of the collet of FIG. 11B;

FIG. 12A is a bottom plan view of the cam portion of the valve assembly as would be seen along the sight line 12A—12A as applied to FIG. 10;

FIG. 16 is a fragmentary perspective view of the stove of FIG. 1A to illustrate the conduits between the valve assembly and one of the burners;

FIG. 17 is an enlarged sectional view as seen along the line 17—17 as applied to FIG. 16;

FIG. 18 is a longitudinal sectional view as seen along the line 18—18 applied to FIG. 17;

FIG. 30 is a fragmentary perspective view of a third embodiment of the connector;

FIG. 31 is a sectional view as seen along the line 31—31 of FIG. 30;

FIG. 32 is a view similar to FIG. 31 but of a modification of the embodiment thereof.

FIG. 33A is a front elevational view of an embodiment of the canister cap of the present invention.

FIG. 33B is a top plan view of a pedestal portion of the canister cap of FIG. 33A;

DETAILED DESCRIPTION

Figure 1B:
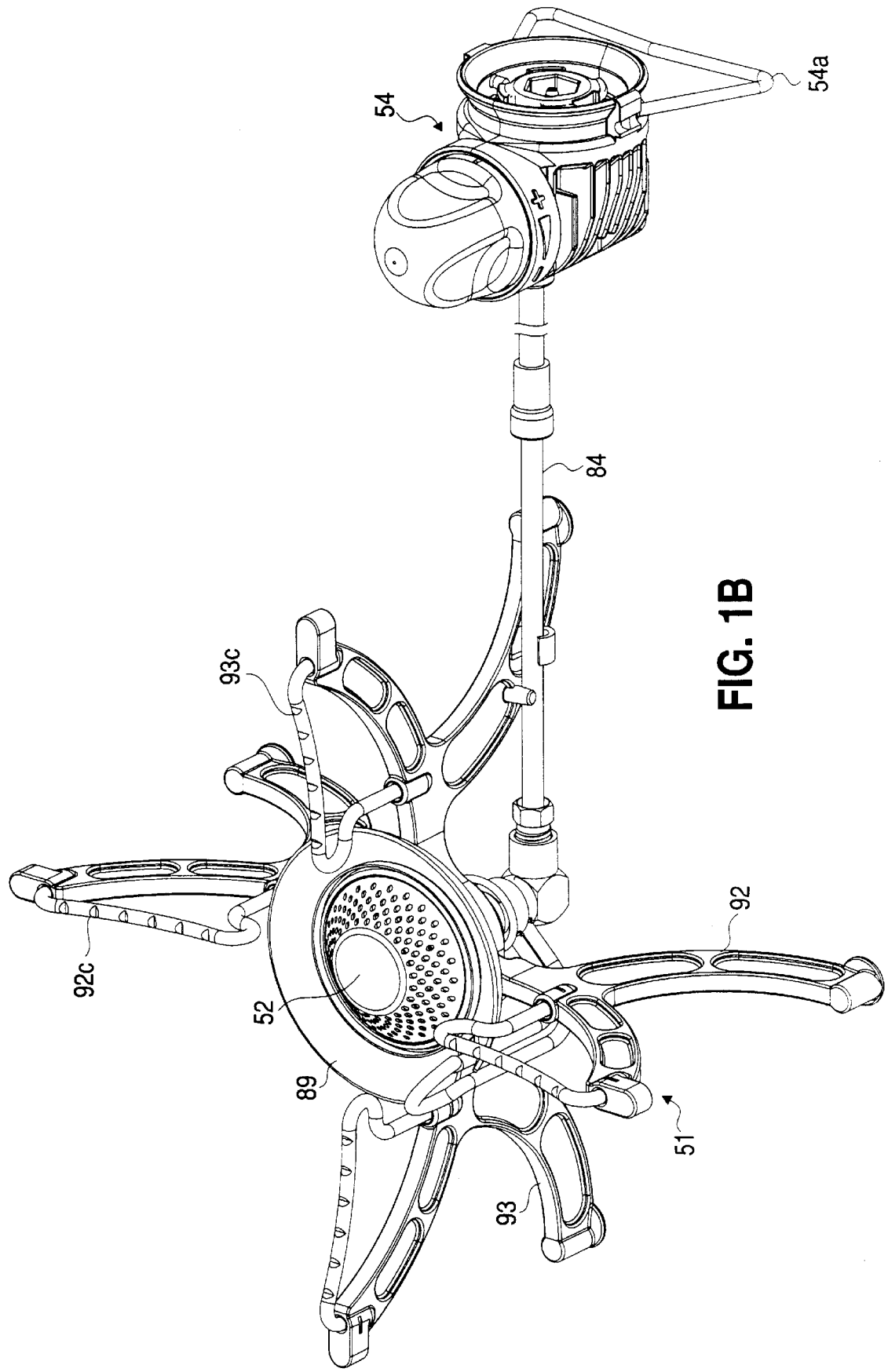
FIG. 1B is a perspective view of another embodiment of the portable camp stove of the present invention.

In the illustration given and with reference first to FIG. 1A, reference numeral 50 designates generally the portable camp stove which exemplifies advantageous use of our invention. The stove includes a collapsible or foldable frame 51 (see FIG. 2) which supports two identical burners 52 and 52'—the latter being shown in the upper left of FIG. 1A.

Starting at the upper right in FIG. 1A, this application of the invention includes a canister 53 containing pressurized liquified petroleum gas (LPG) fuel. More particularly, the fuel may be a butane fuel or a butane/propane mixture in liquid form and the canister can be of conventional aerosol design such as that provided for in U.S. Department of Transportation Specification 2P or 2Q.

Connected to the cap of the canister 53 is a valve assembly 54. Coupling the valve assembly 54 to the burners 52, 52' are conduit means generally designated 55. As indicated previously, there are inventive features in each of the components just mentioned, and these will be described in serial fashion, starting with the canister. Thus, there is a flow path from the cap of the canister 53 to the burners 52, 52'.

Canister

FIGS. 3 through 5A and 5B show a canister 53 of the present invention, for containing LPG fuel. The canister is preferably a generally cylindrical aerosol-type vessel, and can be largely conventional in design, with the primary exceptions being a unique outlet pedestal and a unique dip tube, discussed below. U.S. Department of Transportation Specifications 2P and 2Q provide examples of conventional aerosol designs.

While the canister of the present invention has utility with various pressurized liquids, it is particularly applicable for use with LPG fuels. In the preferred embodiment, for use with a camping stove, the canister contains an LPG fuel such as butane fuel or a butane/propane fuel mixture in liquid form. Vaporized fuel, as well as perhaps a vapor propellant, may be present in the canister above the surface 61 of the liquid fuel.

The canister 53 includes a cap 58. An outwardly projecting pedestal 63 extends from the base 58a of the cap 58 and includes a top closure equipped with a sealable canister outlet 63a. The axis of the pedestal 63 is substantially coincident with the axis of the canister 53, and the outlet 63a lies generally on that axis. Seated within the outlet 63a can be an aerosol-type check valve, which includes an orifice 75' in a webbing or seal 75, through which a standard probe or "bayonet" valving mechanism can be inserted, but can employ any of a number of valves known in the art. The Applicants pedestal is not conventional in shape, as discussed in more detail below.

An annular groove 71 is provided in a perimeter wall 58b of the canister cap 58 (as best seen in FIG. 10). This groove is a generally standard feature in aerosol canister caps, formed during the conventional rolling process in which the cap is affixed to the canister. However, the canister of the present invention takes advantage of this feature in a unique manner, as discussed below.

Dip Tube

As shown in FIGS. 4, 5A and 5B, a dip tube 56 depends inwardly from the outlet of the canister 53. In the embodiment shown, the dip tube 56 includes a rigid tube 57, which comprises the majority of the length of the dip tube 56, and a flexible plastic coupling 59. The coupling 59 couples the rigid tube 57 in flow communication with the canister outlet. The coupling 59 can be attached to the rigid tube 57 by any of a number of well know means. In this embodiment, the rigid tube 57 is threaded and has a reduced diameter at its proximal end, which is friction fit with the flexible coupling 59.

The rigid tube 57 is preferably formed of metal and weights the dip tube 56 to insure that the free end 56a of the dip tube always settles within, i.e., falls to a low position inside, the canister, regardless of the orientation of the canister. FIG. 4 shows the canister in an upright position, in which the dip tube 56 depends substantially vertically from the canister cap 58. The dip tube 56 is sufficiently long to extend almost to the bottom 62 of the canister 53. FIGS. 5A and 5B, in contrast, shows the canister disposed on its side, generally horizontally, as it often will be in operation. Here, the free end 56a of the dip tube has fallen within the canister and rests against the side wall of the canister. Thus, the weight of the rigid tube 57 and the flexibility of the coupling 59 help to insure that the free end 56a of the dip tube remains submersed in liquid fuel, i.e., below the surface level 61. This promotes withdrawal of liquid fuel, as opposed to vapors, regardless of the orientation of the canister. Thus, a user need not be concerned with the orientation of the canister during use, and there is no need for any additional mechanism to selectively orient the canister.

The rigid tube 57 is preferably constructed of brass or steel, but other suitable metals may be used. Alternately, the tube 57 may be formed of rigid plastic instead of metal, so long as the tube 57 is resistant to the corrosive effects of the liquid fuel, and so long as the tube 57 is sufficiently weighted to assure that the free end falls to the bottom of the canister. In the case of a metal rigid tube 57, the tube itself will usually be heavy enough. With a plastic rigid tube 57, the weight of the tube may need to be supplemented. The rigid tube 57 may comprise more or less of the overall length of the dip tube than is shown in FIGS. 4 and 5. For example, in one embodiment, not illustrated, the rigid tube 57 can be made of metal and makes up approximately 20% of the length of the dip tube 56.

A flexible plastic sleeve 60 may be provided near the free end of the rigid tube 57, especially in the case where the rigid tube 57 is metallic. If this sleeve 60 is provided, then the rigid tube 57 is preferably terminated somewhat short of the bottom of the canister to accommodate the terminal plastic sleeve 60. Without the sleeve 60, if the tube 57 is metal, the free end of the dip tube 56 would "clank" against the sidewall of the metal canister. While not necessary to the performance of the canister, this sleeve helps to dampen this clanking noise when the canister 53 is shaken or reoriented. The sleeve 60 might not be as beneficial in the case of a tube 57 formed of rigid plastic. On the contrary, if such a sleeve 60 were employed with a rigid plastic tube 57, additional weight might have to be provided to counteract any tendency of the plastic sleeve 60 to stick to the metal wall of the canister—a problem inherently overcome in most cases with a metal tube 57.

The flexible coupling 59 and the plastic sleeve 60 are preferably constructed of one of the many flexible plastic materials which are capable of withstanding chemical attack by LPG over many years.

Alternate mechanisms may be employed to hinge the dip tube 56. It is not necessary to employ a two-piece dip tube with a rigid tube and a flexible coupling. For example, a single rigid plastic tube with a circumferentially corrugated section i.e., reminiscent of a bendable drinking straw, may be employed.

With reference to FIG. 5B, another embodiment of a dip tube 54 is shown with a circumferentially corrugated section 54a formed near the end of the dip tube proximate to the outlet of the canister 53. In this embodiment a weight 55 which may comprise a solid cylinder with a plurality of longitudinal grooves 55(a) formed in its outer surface is inserted in the free end of the dip tube 54. The grooves allow the fuel to pass between the outside surface of the cylindrical weight and the inner surface of dip tube 54.

An angled dip tube with a pivot could achieve the same result. In either case, it might be necessary to weight the free end of the dip tube 56, such as with a metallic tubular insert or collar, to insure that it remains properly oriented within the canister 53. It is possible to fabricate a dip tube 56 from a single flexible tube, but additional weight or other design features might be necessary to compensate for its tendency to curl or stick to the inside of the canister.

Pedestal

As mentioned previously in connection with the embodiments illustrated in FIGS. 3 through 5A and 5B, the pedestal 63 of the canister 53 of present invention is not conventional in shape. Of particular note is its noncircular, cylindrical shape, i.e., a cylinder having noncircular cross section perpendicular to the axis of the outlet 63a.

More specifically, for purposes herein, it will be understood and accepted that generally a cylinder has a lateral surface and is bounded by a pair of planes, cross-sectioning the lateral surface of the cylinder. For purposes of discussion, the cross-sectional planes will be referred to as the bases of the cylinder. If the bases of the cylinder are circles, the cylinder is referred to herein as a "circular cylinder." In contrast, a "noncircular cylinder", as used herein, does not include such a circular cylinder having a smooth exterior lateral surface. Rather, a noncircular cylinder as used herein includes all other shapes, including but not limited to cylinders that are elliptical, parabolic, ovoid, and polygonal, both regular and irregular, and especially includes a hexagonal shape according to a preferred embodiment. In addition, a noncircular cylinder as used herein can be a substantially circular cylinder having a one or more protuberances on its exterior lateral surface.

This noncircular, cylindrical shape has multiple advantages. First, the shape will not mate well with a conventional valving mechanism designed to receive a circular pedestal, thus impeding the use of the canister 53 in an inoperative environment—such as with an appliance designed to be fueled by gaseous, as opposed to liquified fuel, i.e., vapor withdrawal systems. Second, the noncircular, cylindrical pedestal can act as a contact surface to rotate a cam-activated valving mechanism or other output connector, permitting a simple push-and-twist attachment of the canister to a burning appliance. Briefly, the pedestal 63 of the canister 53 can be inserted into a matching opening in a valving mechanism. Once inserted, rotation of the canister 53—and the noncircular, cylindrical pedestal 63—about its axis can impart torque to the valving mechanism. This torque can be used to activate a mechanism to secure the valve to the canister 53. Examples of a unique cam-activated valving assembly are described below, and the interaction of the pedestal 63 therewith will be discussed in more detail later. However, it will be appreciated that the canister pedestal of the present invention is not limited to use with this particular valving mechanism.

Returning to FIG. 10, the pedestal includes a lower part 63a and an upper part 63b, which have different cross-sectional shapes. The upper part 63b is slightly narrower than the lower part 63a, and has a circular cross section and a rounded upper edge. This facilitates insertion of the pedestal into a matching valve assembly and seating of the pedestal in seals provided therein. However, this feature is not necessary to the invention, and the pedestal 63 can have a uniform cross section throughout its length.

The lower part 63a is illustrated as having a hexagonal shape, but may have any non-regular cylinder shape, including a substantially circular cylindrical pedestal with one or more protuberances on its side. It is preferred that the pedestal cross section be substantially regular polygonal, centered at the canister outlet 63a, although the realties of metal forming make it unlikely that a true polygon can be achieved. This makes it easier to properly orient the canister relative to a mating valve assembly. It also promotes a more fully perimetric application of force from the canister 53 to the valve assembly. Rotation of the canister 53 applies forces to the mating valve assembly at a plurality of points or portions distributed relatively evenly about the coincident axes of the canister and pedestal.

An embodiment of the canister cap 58 is shown in FIGS. 33A and 33B. The cap has no annular groove because it has not yet been rolled onto a canister 53. The cap 58 can be formed of any suitable material, and in this embodiment 0.018 inch tin-plate is used. In one embodiment, the pedestal has a regular hexagonal cross section. The cross section of the pedestal, in this embodiment, has an inscribed diameter (across from side to side) of approximately 0.420 to 0.426 inches and a circumscribed diameter (across from corner to corner) of approximately 0.450 to 0.460 inches in order to minimize the bulk while providing enough space to embed the aerosol valve. While it is preferred that the tolerances of the dimensions be small, in order to provide a more precise fit with the valve assembly 46, this is not necessary to the operability of the invention.

The pedestal must be sized to substantially encase the aerosol valve. In order to protect the pedestal 63, the pedestal 63 can be designed to not extend significantly beyond the lip of the canister cap 58. In one embodiment, the pedestal extends approximately 0.365 to 0.374 inches from the base of the cap 58, and the upper part 63b is approximately 0.051 inches in height and has a radius of curvature 63r at its upper edge of approximately 0.029 inches. In this embodiment, a neck 63c, below the lower part 63a of the pedestal 63 comprises approximately the first 0.094 inches of the height of the pedestal 63, and the neck 63c and the upper part 63b of the pedestal each have an interior diameter 63d of approximately 0.379 to 0.384 inches. The dimensions set forth throughout this disclosure are intended to be exemplary and not limiting.

Valve Assembly—Valving

Figure 6B:
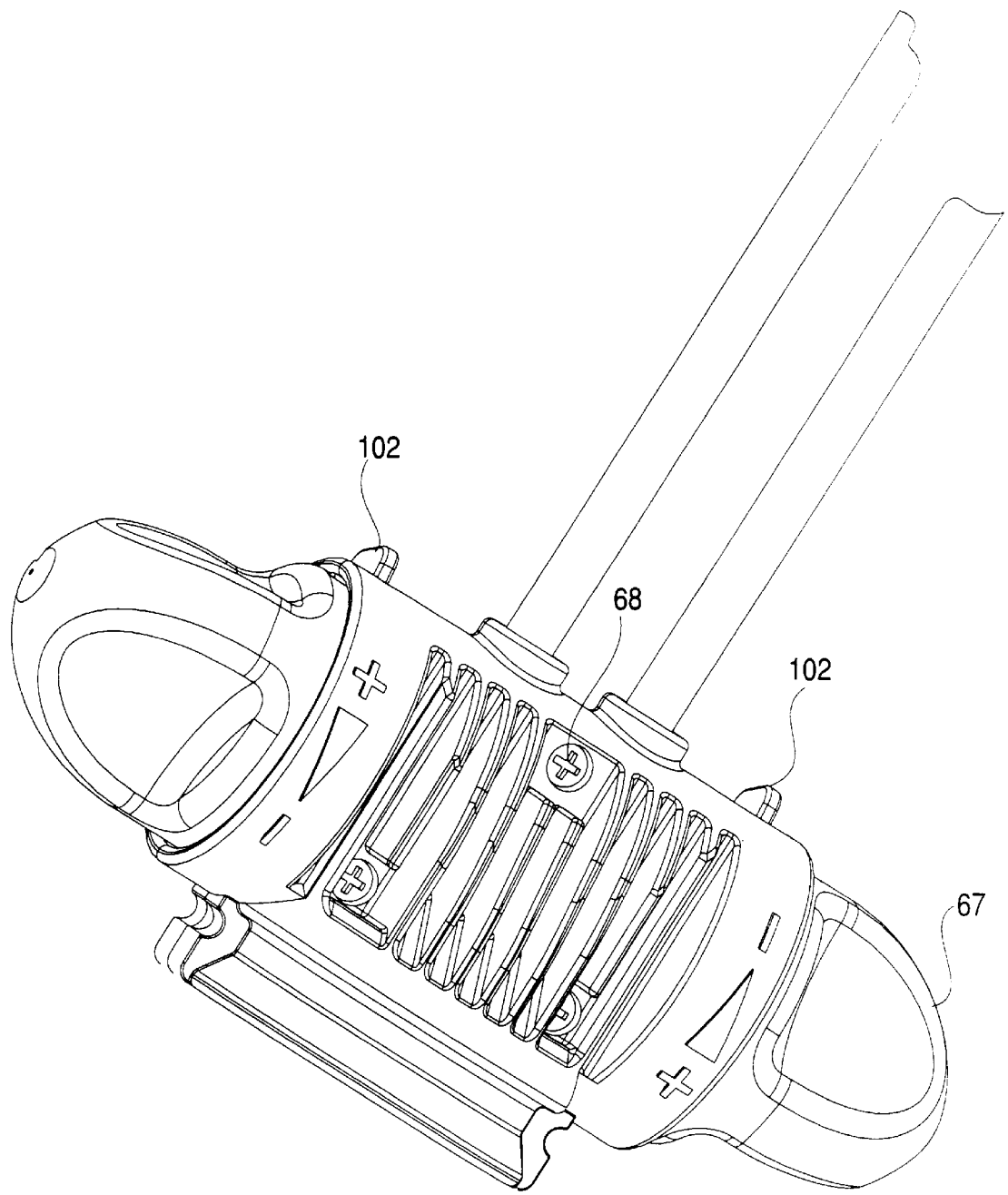
FIG. 6B is a fragmentary perspective view of another embodiment of the valve assembly of the present invention.
Figure 6D:
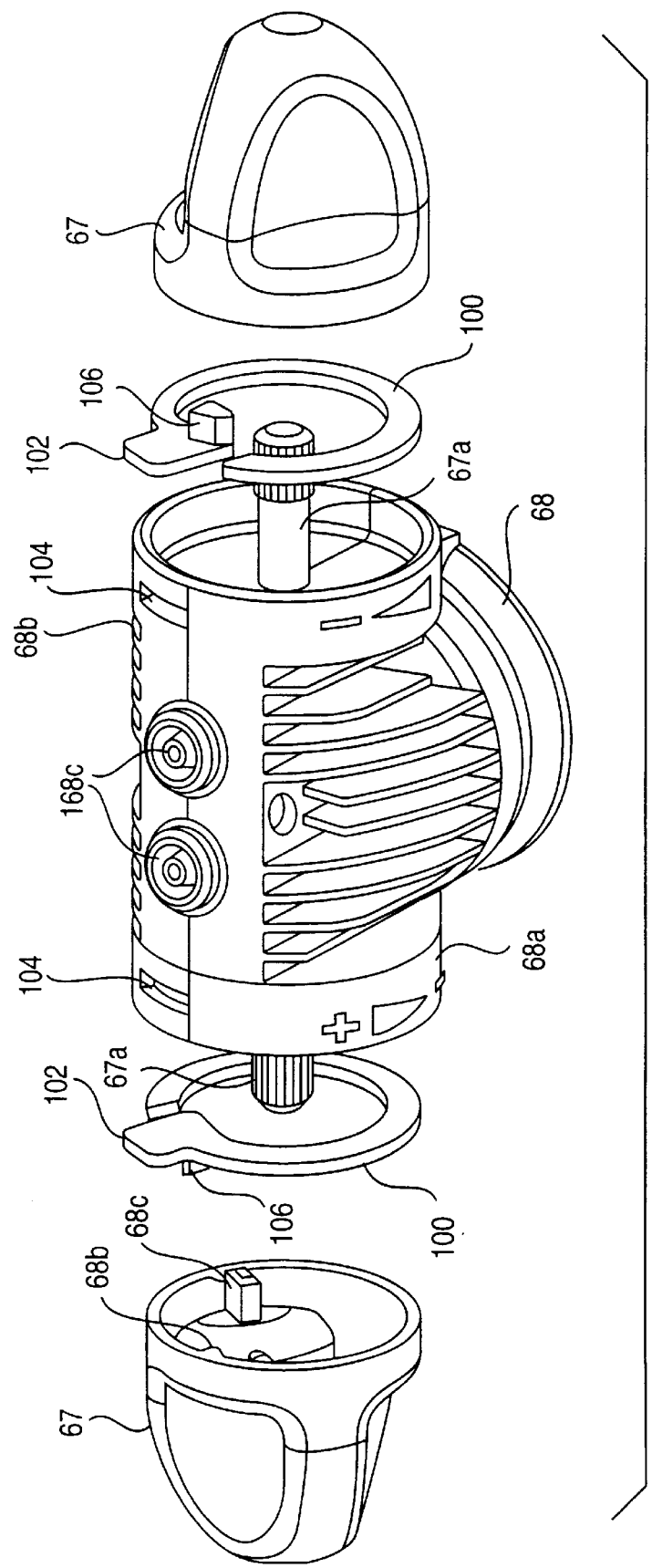
FIG. 6D is an exploded perspective view of the valve assembly of FIG. 6B.

The valve assembly 54, mentioned previously with reference to FIG. 1A, is described first in conjunction with FIGS. 6 through 8. The valving function of the assembly 54 is performed by essentially conventional means, with the exceptions noted herein. An indented knob 67 is provided for each valve—one for each burner 52, 52'. A suitable known valve, which can be adapted for use in the present invention, can be seen in British Patent No. 2 262 156B. However, the valve assembly disclosed herein provides several unique and advantageous features. As seen in FIGS. 6B through 6D, the preferred assembly housing 68 has a "clam shell" construction. In other words, a pair of shells 68a, 68b are secured together by screws, adhesive, or the like, to form a single housing. In the illustrated embodiment, three screws hold the shells together. The shells 68a, 68b are similar in shape. One shell has bores through which screws can be channeled and is adapted to receive the heads of the screws, while the other shell has threaded bores for engaging the threads of the screws. Preferably the assembly housing is made of magnesium alloy or aluminum alloy.

As seen in FIG. 6C, contained within the housing is a generally "T-shaped" valve body 168, preferably made of brass. The valve body has an inlet probe 74 for insertion into the fuel canister. A "T-shaped" internal passage 168a leads from the probe to a pair of tapered valve chambers 168b located at opposite ends of the valve body and sharing a common axis. Arranging the valve chambers in this manner contributes to the overall compactness of the valve assembly. Further, the coaxial alignment of the valve chambers advantageously allows a user to grasp and twist the valve assembly when connecting a fuel canister thereto. Yet further, arranging the chambers in this manner facilitates cleaning of the valve assembly. Each valve chamber is tapered to fittingly receive a valve stem 67a of a corresponding control knob 67. Extending from the valve body are a pair of parallel cylindrical outlet fittings 168c, through which outlet passages 168d extend from a respective valve chamber. A fuel conduit is secured to each fitting by means of a clamp or the like. In accordance with this arrangement, the valve body defines an airtight flow path from the fuel canister to each fuel conduit.

Each valve chamber is threaded to receive a complementarily threaded valve stem connected to an actuator, such as a control knob. Rotating the control knob in one direction, counterclockwise, for example, opens the valve to allow fuel to flow from the canister to the fuel conduit corresponding to that control knob. Conversely, rotating the control knob in the other direction, i.e., clockwise, closes the valve to stop the flow of fuel.

Advantageously, the valve assembly employs a positive stop mechanism for limiting the quantity of fuel supplied to the burner during ignition thereof. The positive stop mechanism comprises a ring-shaped member 100 seated within the assembly housing and through which the valve stem extends, and two projections 68b, 68c formed on the internal circumference of the control knob. The ring, preferably made of plastic, is shown in detail in FIG. 6D and has a release button 102 that projects through a slot 104 in the assembly housing. Directly below the tab 102 is a stopper 106 that projects partially into the hollow interior of the control knob. The stopper has a tapered shape, with an outer surface curved to slide along the internal circumference of the control knob. The ring is broken directly adjacent to the tab and stopper, thus allowing the ring to elastically deform when the tab is depressed. Spaced along the internal circumference of the control knob are the pair of projections 68b, 68c (in this embodiment spaced approximately 120° apart), one 68c of which is L-shaped and the other 68b of which is wedge-shaped.

In operation of the illustrated embodiment, as the control knob is rotated counterclockwise to open the valve, the wedge-shaped projection 68b abuts against the stopper 106, thereby preventing further counterclockwise rotation of the control knob. At this point, a preselected quantity of fuel is delivered to the burner for ignition thereof. After the burner is ignited, if a higher fuel output is desired, the control knob can be further rotated in the counterclockwise direction by depressing the release button 102, causing the stopper 106 to drop below the wedge-shaped projection 68b. When the valve is fully-open, the L-shaped projection 68c abuts against the stopper 106, thus preventing further counterclockwise rotation of the control knob, regardless of whether the tab is depressed again. This feature, and thus the projection 68c, are preferred but are not necessary to the operation of the positive stop mechanism. To close the valve, the control knob 67 is rotated in the clockwise direction. When the control knob is rotated in the clockwise direction, the wedge-shaped projection 68b and stopper 106 simply slide past one another without impeding rotation of the control knob 67.

Either the projection 68b or the stopper 106 should be tapered, but it is not necessary that both be so tapered. This permits the valve to be closed without engaging the stop mechanism, which is not a necessary feature of the invention, but is preferred. The projection 68c need not be L-shaped, but does need to provide a contact surface that will impinge against the stopper.

The valves are surrounded in a heat conductive relationship with a heat sink—as illustrated by the aluminum, magnesium, or other housing 68, which may additionally be equipped with fins 69. This heat sink assists with the vaporization of fuel at a low input setting and an initial light up. Without the heat sink, the temperature of the valve may drop too low to operate correctly. The heat sink helps keep the temperature of the valve up to help avoid such problems.

Although the foregoing description of the valve assembly relates to a dual valve, the advantageous features such as the positive stop mechanism and heat sink equally apply to a single valve and to valve assemblies having three or more valves.

Figure 1C:
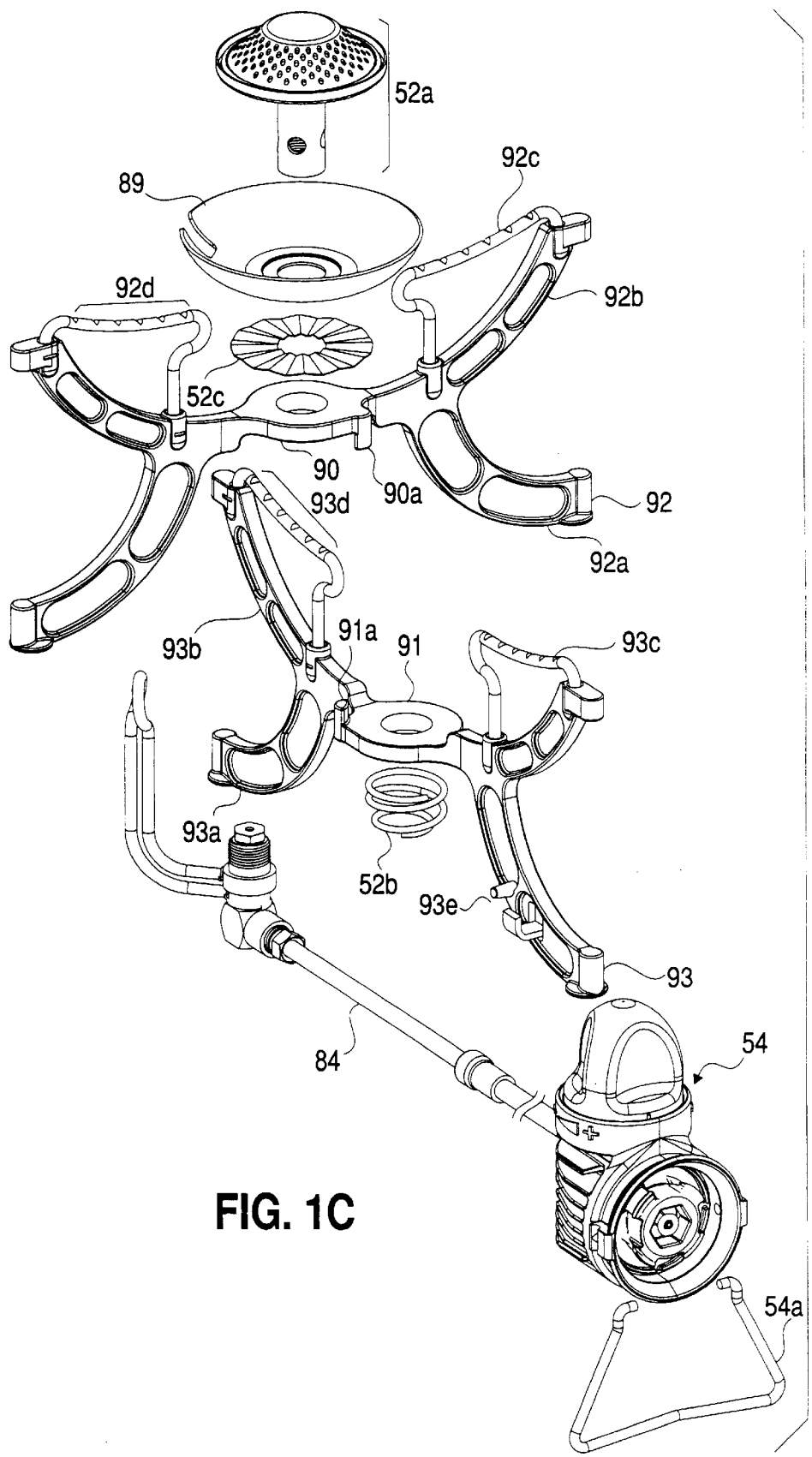
FIG. 1C is an exploded perspective view of the stove of FIG. 1B.

As seen in FIGS. 1B and 1C, the valve assembly 54 includes a support bracket 54a, which lends stability to the stove. The support bracket 54a impedes a canister, to which the valve assembly 54 is connected, from rolling, which could cause the stove to tip.

Valve Assembly—Connection to Canister

FIGS. 6 through 15 illustrate an embodiment of the unique valve assembly 54 of the present invention. Referring initially to FIGS. 6 through 9, the valve assembly includes a cam 64 and a collet 66. The cam 64 and the collet 66 cooperate in connecting the valve assembly 54 to a canister, such as the canister 53 discussed above.

The annular collet 66, illustrated in detail in FIGS. 11A through 11F, includes a plurality of cantilevered L-shaped fingers 65, which extend generally perpendicularly from the collet. In these embodiments, four fingers 65 are spaced substantially evenly about the collet 66, at a common radial distance from a center of the collet. Enlarged portions or pawls 70 extend from the fingers 65, at a distance from the base of the collet. The fingers 65 have a tapered leading edge 65a (FIG. 11B), a trailing-edge ridge 65b, and a notch 65c between the edge 65a and the ridge 65b, the purpose of which will be described below.

The collet 66 is fixed to the valve assembly 54. This can be accomplished by a number of means, such as rivets, adhesive, or other like well-known methods. In the preferred embodiment, the collet has a flange 66a which fits into a matching groove (not shown) in the valve assembly 54. At least one notch 66b is provided in the flange, into which a matching protuberance in the groove fits, to keep the collet 66 from rotating. A circumferential lip 66c abuts the valve assembly 54 and helps to prevent lateral movement of the collet 66. The circumferential lip 66c also acts to limit the upward movement of the canister into the valve assembly 54.

Figure 12B:
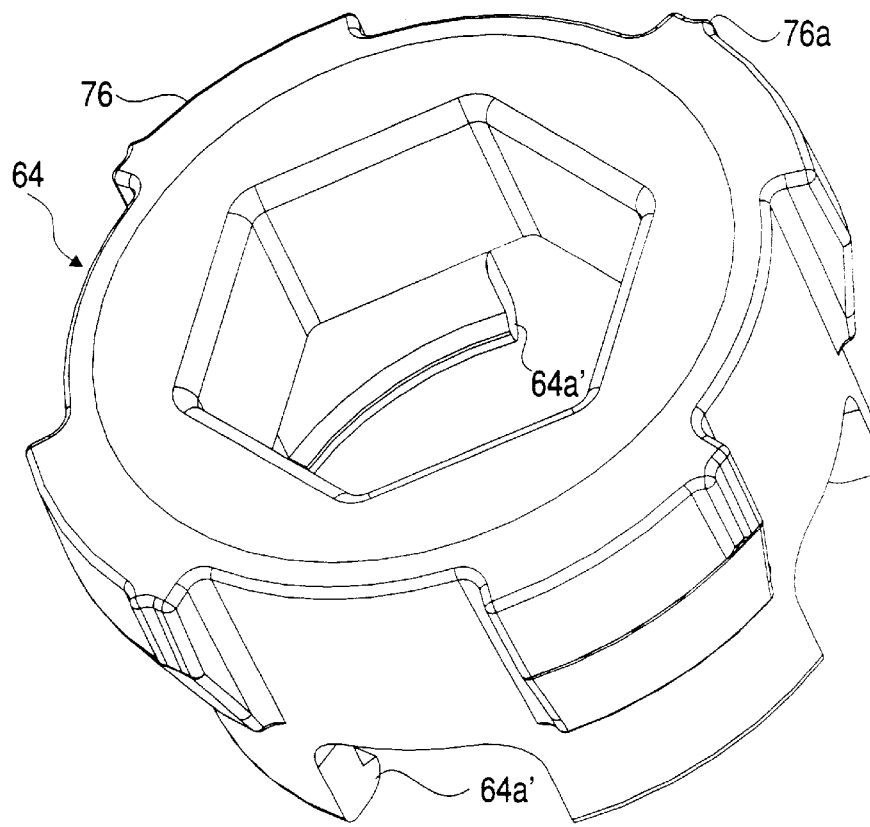
FIG. 12B is a perspective view of an embodiment of the cam of the present invention.
Figure 12C:
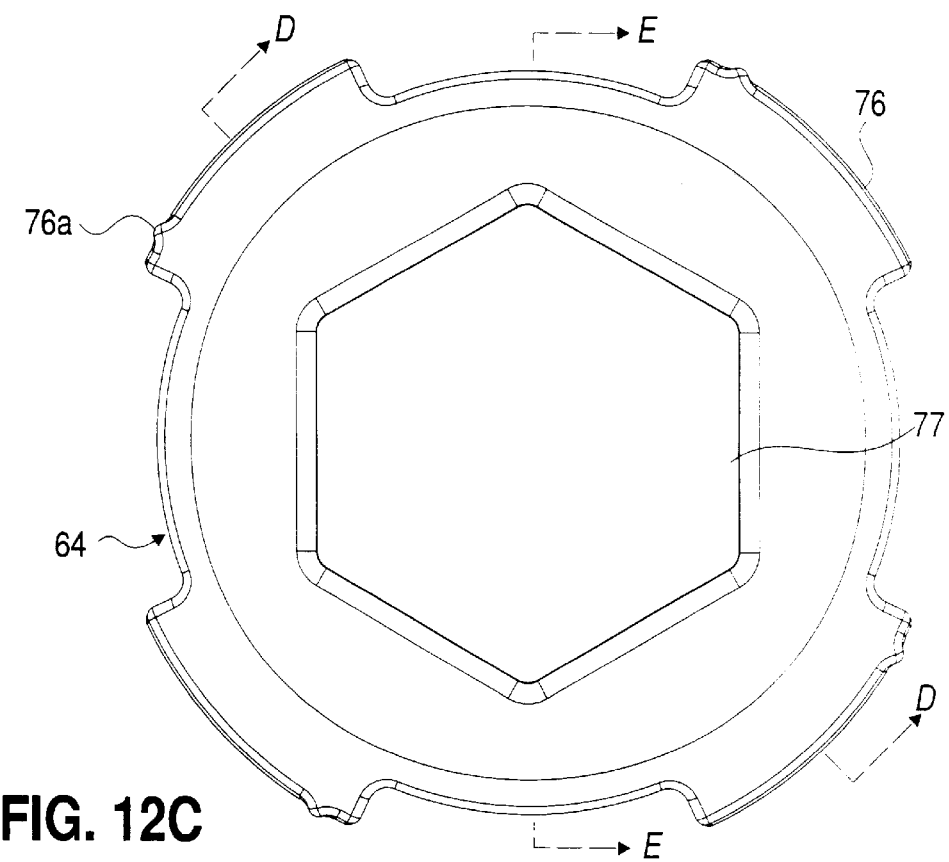
FIG. 12C is a front plan view of the cam of FIG. 12B.
Figure 12D:
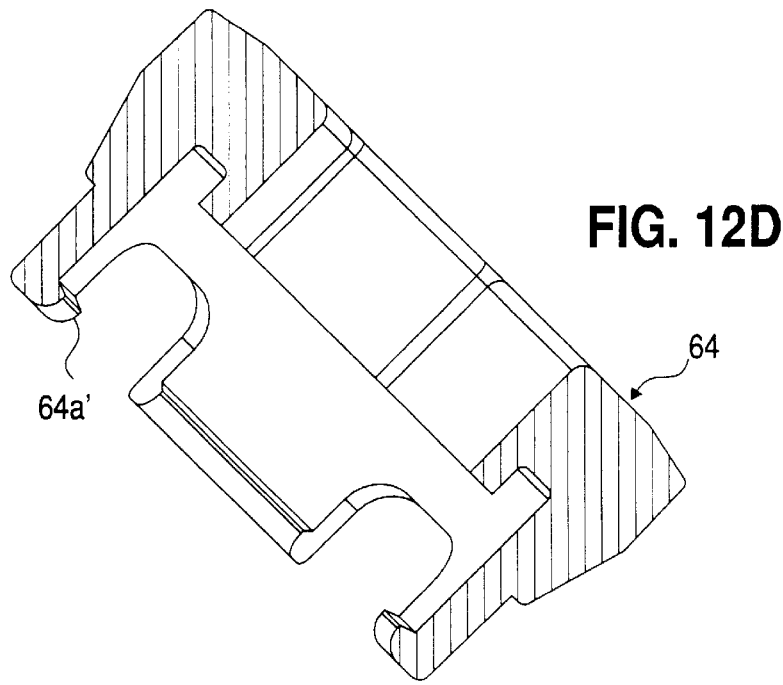
FIG. 12D is a sectional view taken along the line D—D of FIG. 12C.
Figure 12E:
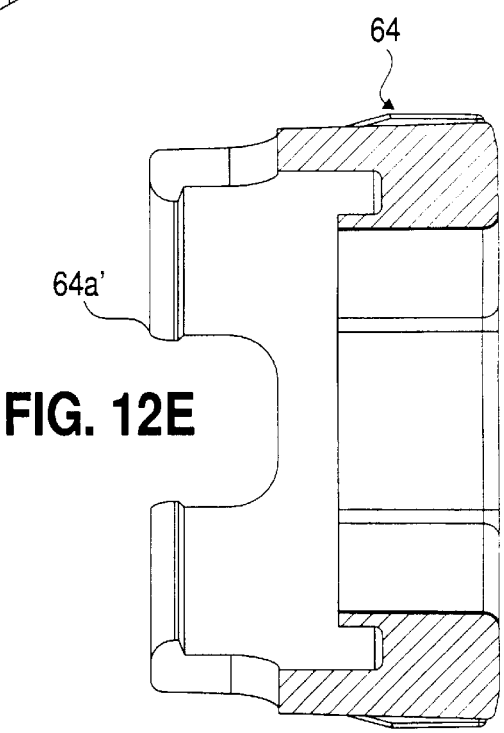
FIG. 12E is a sectional view taken along the line E—E of FIG. 12C.
Figure 12F:
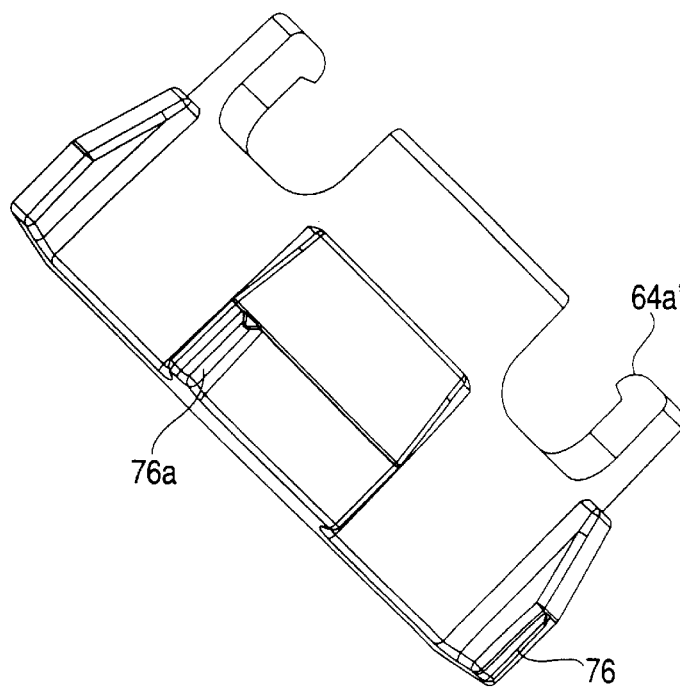
FIG. 12F is a side elevational view of the cam of FIG. 12B.

As illustrated in detail in FIGS. 12A through 12F, the cam 64 has a noncircular, cylindrical receptacle 77, dimensioned to match the noncircular, cylindrical pedestal 63 of the canister. The cam 64 sits within the collet 66 and is disposed to rotate relative to the valve assembly. This can be accomplished by any of several well-known mechanisms, such as connecting the cam to the valve assembly with an outwardly extending lip 64a, as shown in FIG. 10, or an inwardly extending lip 64a', as shown in FIG. 12B, which sits in a matching groove (not shown) in the valve assembly 54. The cam rotates about the valve probe 74, which extends from the valve assembly 54 partially through the receptacle 77. Preferably, the receptacle 77 has an axis coincident with the valve probe 74. Disposed about the perimeter of the cam 64 are a series of radially extending lugs 76. The lugs 76 can be uniform in cross section, or be tapered as is apparent from FIG. 12B. Further, the lugs 76 can each have a raised rib 76a, which corresponds to the groove 65c of each finger 65.

In operation, briefly, when the cam 64 rotates, the lugs contact and force the collet fingers 65 outwardly, which causes the pawls 70 on the collet fingers 65 to also spread outwardly—and into the annular groove 71 of the canister cap 58. This locks the valve body 54 to the canister 53. Seals can be provided at contact points between the body 54 and canister 53, such as the pair of seals 72, 73 best seen in FIGS. 10 and 13.

Figure 13:
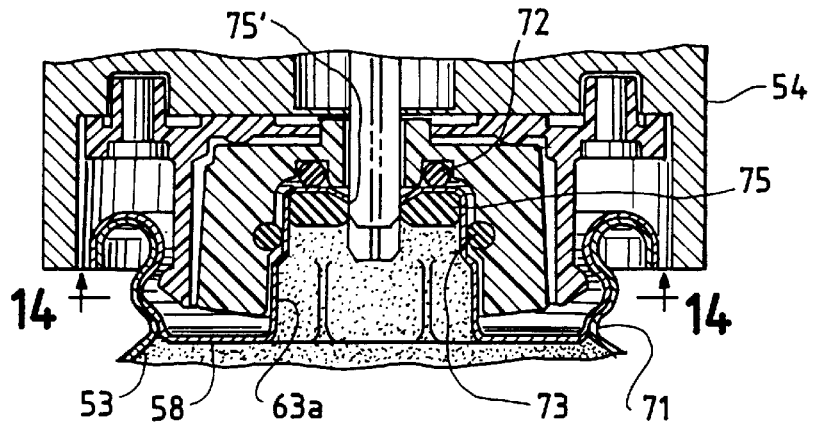
FIG. 13 is a view similar to FIG. 10 but with the valve assembly connected to the canister.
Figure 14:
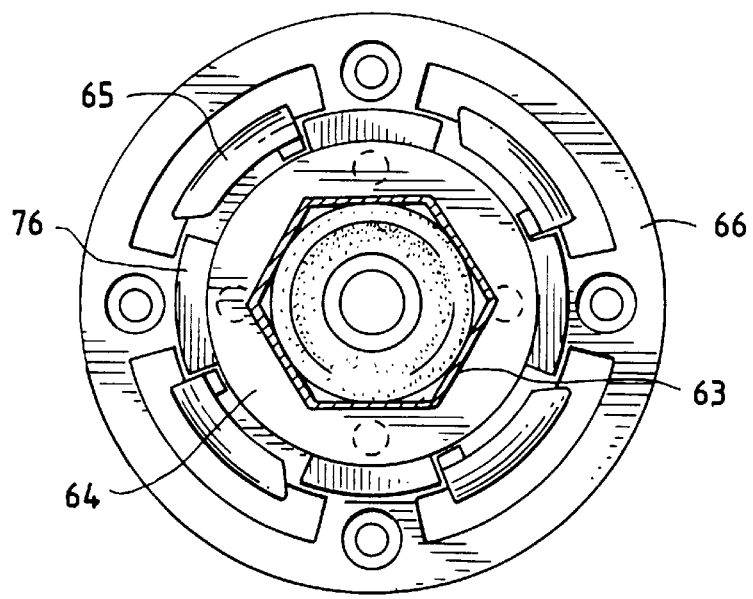
FIG. 14 is a view taken along the sight line 14—14 as applied to FIG. 13 and showing the collet and cam members in condition prior to operative engagement.

In more detail, before the valve assembly 54 is connected to the canister 53, the collet 66 and cam 64 are disposed relative to one another as shown in FIG. 14. At this point, the lugs 76 of the cam 64 are disposed in gaps between the fingers 65 of the collet. The valve assembly 54 and the canister 53 are first aligned with one another as shown in FIG. 10, so that the extended probe 74 is aligned with the depression or recess 75' in the seal 72 of the cap 58. The valve assembly 54 and the canister 53 are then brought together, and the probe 74 is inserted through the recess 75' in the canister seal 75, as best seen in FIG. 13. At this point, the hexagonal, cylindrical (in this embodiment) pedestal 63 of the canister 53 sits within the matching hexagonal, cylindrical receptacle 77 in the cam 64.

Figure 15:
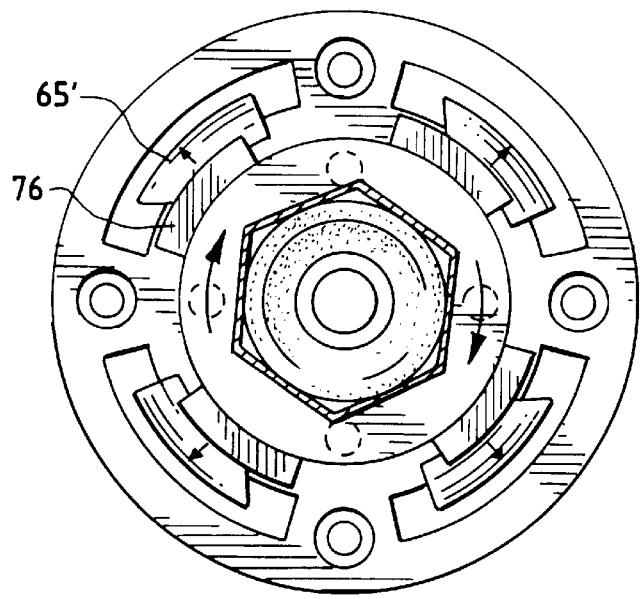
FIG. 15 is a view similar to FIG. 14 but showing the collet and cam members in operative engagement.

In order to secure the connection, the canister 53 is twisted like a screwdriver relative to the valve assembly 54. Because of the mating noncircular, cylindrical pedestal 63 and receptacle 77, this twisting rotates the cam 64, which forces the lugs 76 of the cam 64 to contact the fingers 65 of the collet 66. The inner surfaces of the fingers 65 are disposed slightly closer to center than the outer surfaces of the lugs 76. Therefore, as the lugs contact the tapered edge 65a of the fingers 65, the fingers 65 will deflect outwardly. As the lugs 76 slide into alignment with the fingers, the fingers will be spread. The rotation of the cam 64 is complete when the lugs 76 abut against the ridges 65b of the fingers 65. At this point, the ribs 76a of the lugs sit in the grooves 65c of the fingers, providing resistance to accidental rotation of the cam 64 in the opposite direction. FIG. 15 shows the relative positions of the lugs 76 and the fingers 65' at this stage. As the fingers 65 spread, the enlarged portions or pawls 70 move outwardly and into the annular groove 71 in the cap of the canister 53. Thus, the valve assembly 54 is locked to the canister 53, and until the canister is re-rotated in the opposite direction, the valve assembly 54 and canister 53 remain locked together.

The above-described arrangement provides a highly reliable connection, because the axis of the canister 53 (and thus the pedestal 63) is now coincident with the axes of both the cam 64 and the collet 66. This inventive cam/collet arrangement promotes a more or less fully perimetric application of force from the canister 53 to the cam 64 to the collet fingers 65, even if the cross section of canister pedestal 63 and/or the receptacle 77 is not regular polygonal in shape. Whether the receptacle 77 is hexagonal, cylindrical or other noncircular, cylindrical shape, the rotational forces imparted by the canister will be transferred by the cam at a plurality of locations about the coincident axes, which promotes easy and complete seating of the pawls 70 in the groove 71. Further enhancing the connection is the fact that the fingers move only radially—and not circumferentially—because only the cam 64—and not the collet 66—rotates. This promotes quick and secure seating of the pawls 70 in the groove 71.

Figure 9B:
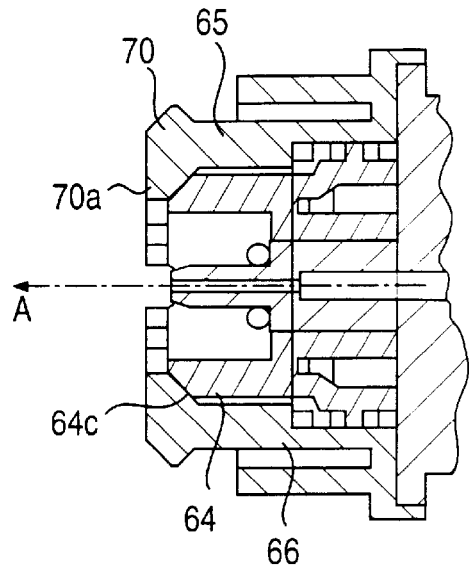
FIG. 9B is a sectional view of an alternate embodiment of the valve assembly of the present invention.
Figure 11G:
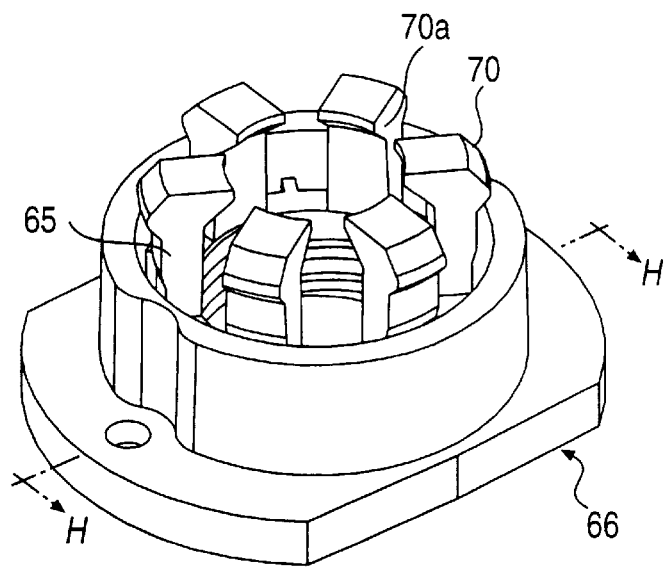
FIG. 11G is a perspective view of the collet of FIG. 9B.
Figure 11H:
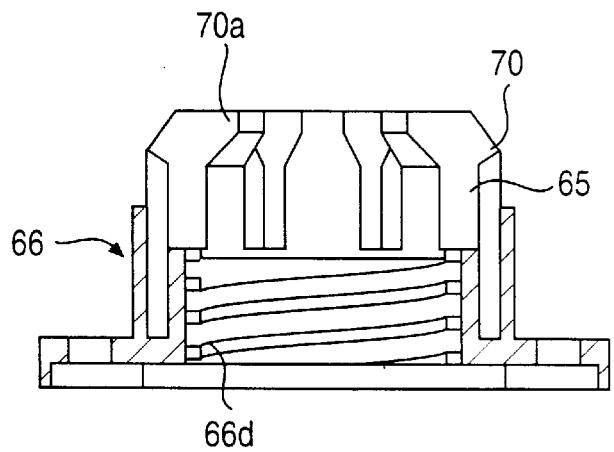
FIG. 11H is a sectional view of the collet taken along line H—H in FIG. 11G.
Figure 11F:
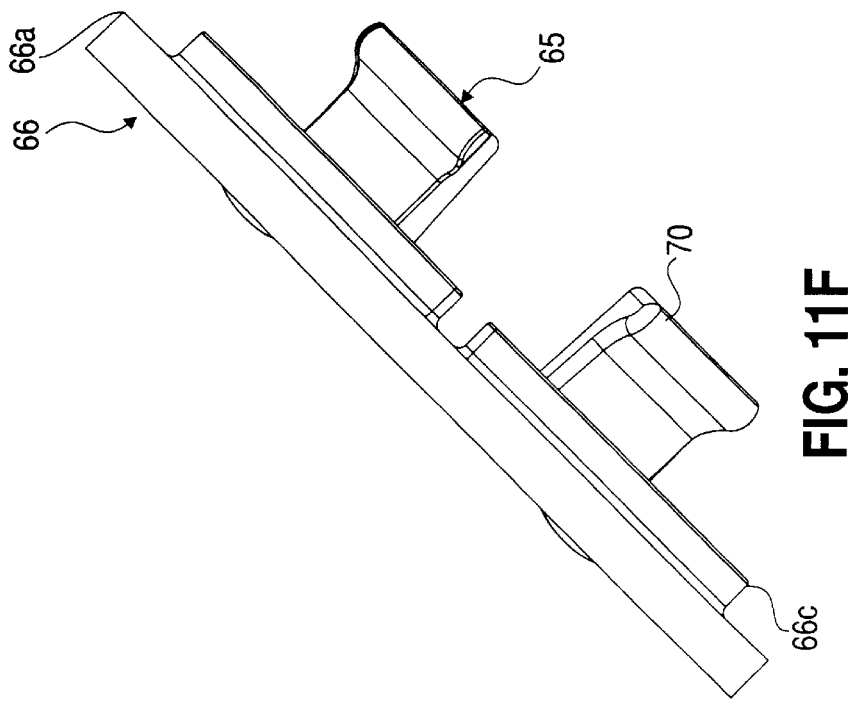
FIG. 11F is another side elevational view of the cam of FIG. 11B.
Figure 11E:
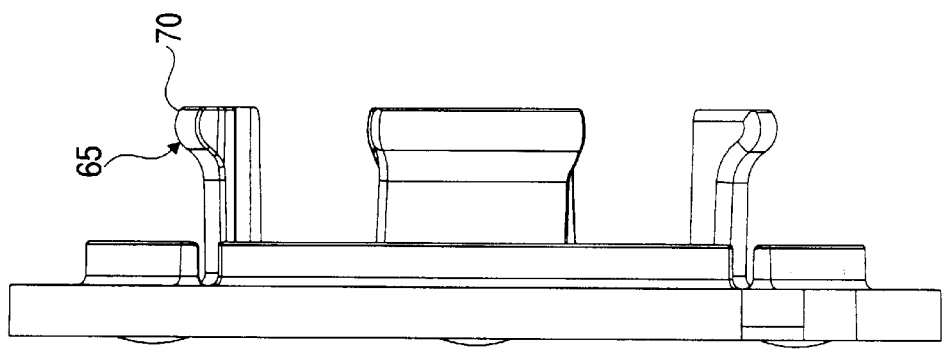
FIG. 11E is a side elevational view of the collet of FIG. 11B.
Figure 11D:
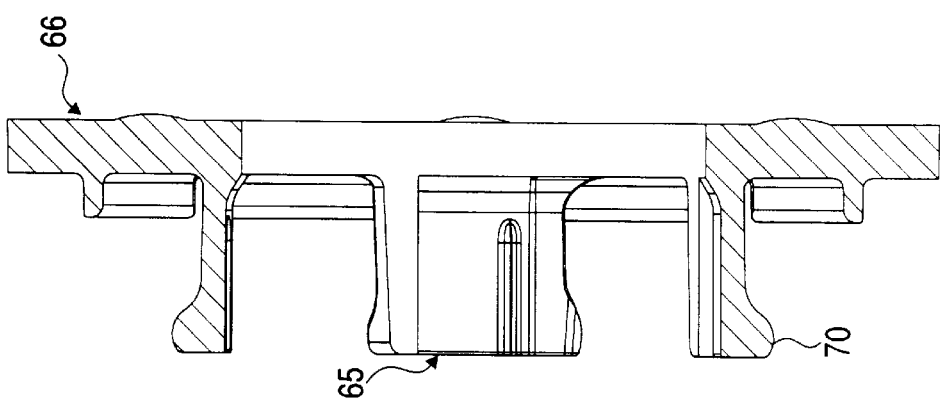
FIG. 11D is a sectional view taken along the line D—D of FIG. 11C.
Figure 12G:
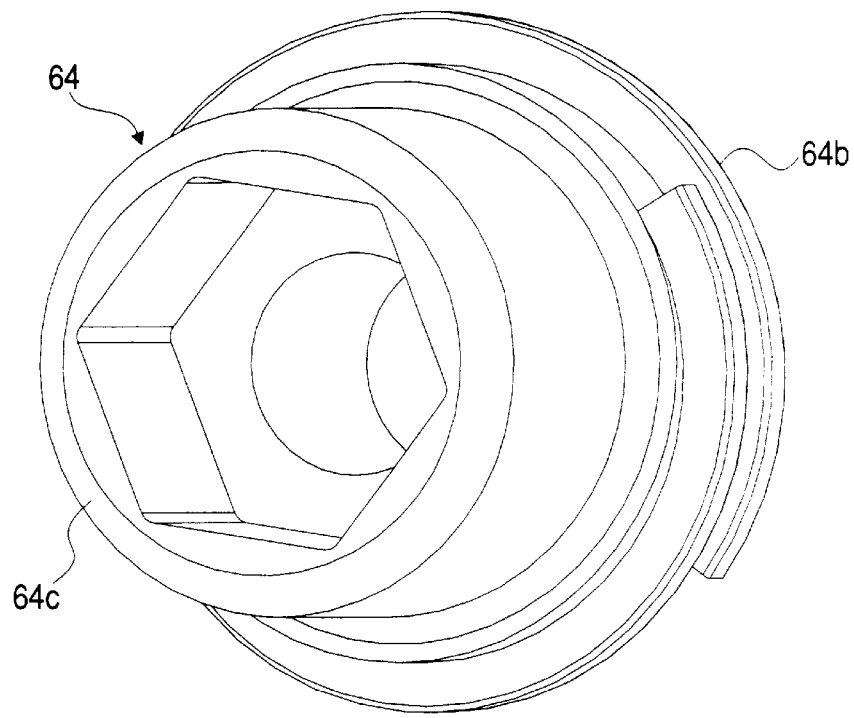
FIG. 12G is a perspective view of the cam of FIG. 9B.
Figure 12H:
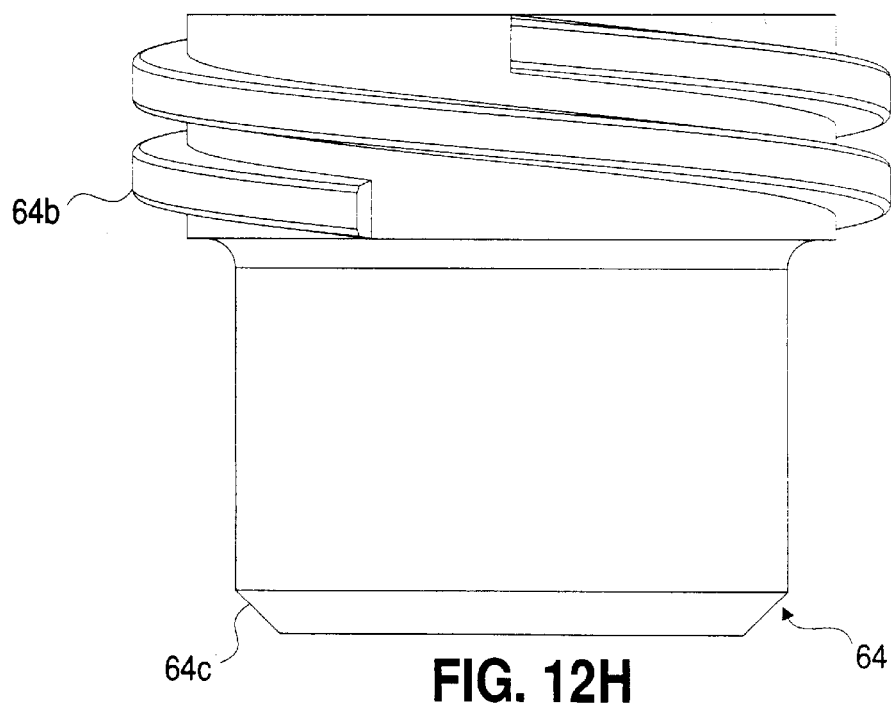
FIG. 12H is a side elevational view of the cam of FIG. 12G.

An alternate embodiment of the cam-and-collet mechanism is shown in FIGS. 9B, 11G and 12G. The collet 66 is similar to the previously discussed embodiments in many respects, but has an inwardly facing set of threads 66d. The collet fingers 65 include inwardly extending pawls 70a opposite the outwardly extending pawls 70. The collet 66 is fixed relative to the valve assembly by any conventional means, such as a noncircular flange, screws, rivets, adhesive, or the like.

The cam 64 sits within the collet and includes a set of threads 64b which mate with the threads 66d of the collet 66. In this embodiment, the cam 64 does not include radially extending lugs, but instead has a contact surface 64c on its leading edge.

In operation, as the cam 64 is rotated by the canister, the mating threads 64b, 66d force the cam 64 to move axially relative to the collet 66. As the cam 64 moves in the direction indicated by arrow A in FIG. 9B, the contact surface 64c will impinge upon the inwardly extending pawls 70a of the collet fingers 65, forcing the fingers 65 to spread. As with the previously discussed embodiments, this forces the outwardly extending pawls 70 into the groove of the canister cap (not shown in these figures).

In the embodiment shown, both the inwardly extending pawls 70a and the contact surface 70c are tapered. While these features improve the interaction between these elements during operation, it is not necessary that both or either of the pawl and the contact surface be so tapered.

While the valve assembly 54 of the present invention is particularly well suited for use in combination with the LPG canister of the present invention, it will be appreciated that the unique cam-and-collet design provides for a simple push-and-twist attachment operation that can be employed with other canisters, supply lines, and the like, as well. It will also be appreciated that the cam/collet mechanism of the present invention can utilize more or fewer lugs and fingers, which can also be spaced or sized differently. It is not, for example, necessary that the lugs and fingers be evenly spaced about the cam and collet, although this does provide the advantages describe above. Also, the lugs and fingers can be shaped differently. For example, rather than taper the fingers 65, the lugs 76 can be tapered; or the grooves 65c and mating ribs 76a can be switched, so that the grooves are on the lugs 76 and the ribs on the fingers 65.

Conduit

This portion of the invention is explained with reference to FIGS. 16 through 19. For example, FIG. 16 shows the lower right hand burner 52 of FIG. 1A. The conduit means 55 of FIG. 1A includes two tubular conduits 78, 79 going from the valve assembly 54 (shown only fragmentarily in FIG. 16—and in the lower right corner) to the burner 52 (and to the "not shown" burner 52'). The conduit 78 extends from the valve assembly 54 to the right hand burner in FIG. 1A—this being the lower burner in FIG. 16.

The novel and advantageous construction of both conduits 78, 79 is exemplified by the conduit 78 depicted in FIGS. 16 through 18. Turning first to FIG. 17 and starting at the outside, there is a protective braid 80 which may be metal or plastic. In the illustration given, the braid 80 is constructed of metallic material, and the flexible tubing 81 is constructed of TEFLON®. The tubing 81 is packed with a solid, flexible plastic rod 82, such as a TEFLON® or rubber rod that is resistant to degradation in LPG. In one embodiment, the conduit tubing 81 has an inner diameter of approximately 0.125" (about 3 mm) and the plastic cylindrical rod has an outer diameter of approximately 0.010–0.015" less.

The purpose of the rod is to reduce the volume of the conduit and to provide a large heat absorbing surface. It also causes a pressure drop across the conduit. The combination of heat absorption and pressure drop helps to produce consistent vaporization during lighting. An additional advantage of the reduced volume is that burner control is improved. Changes in flow settings will be more quickly reflected in burner output, because there will be less fuel in the conduit between the control valve and the burner.

Figure 19:
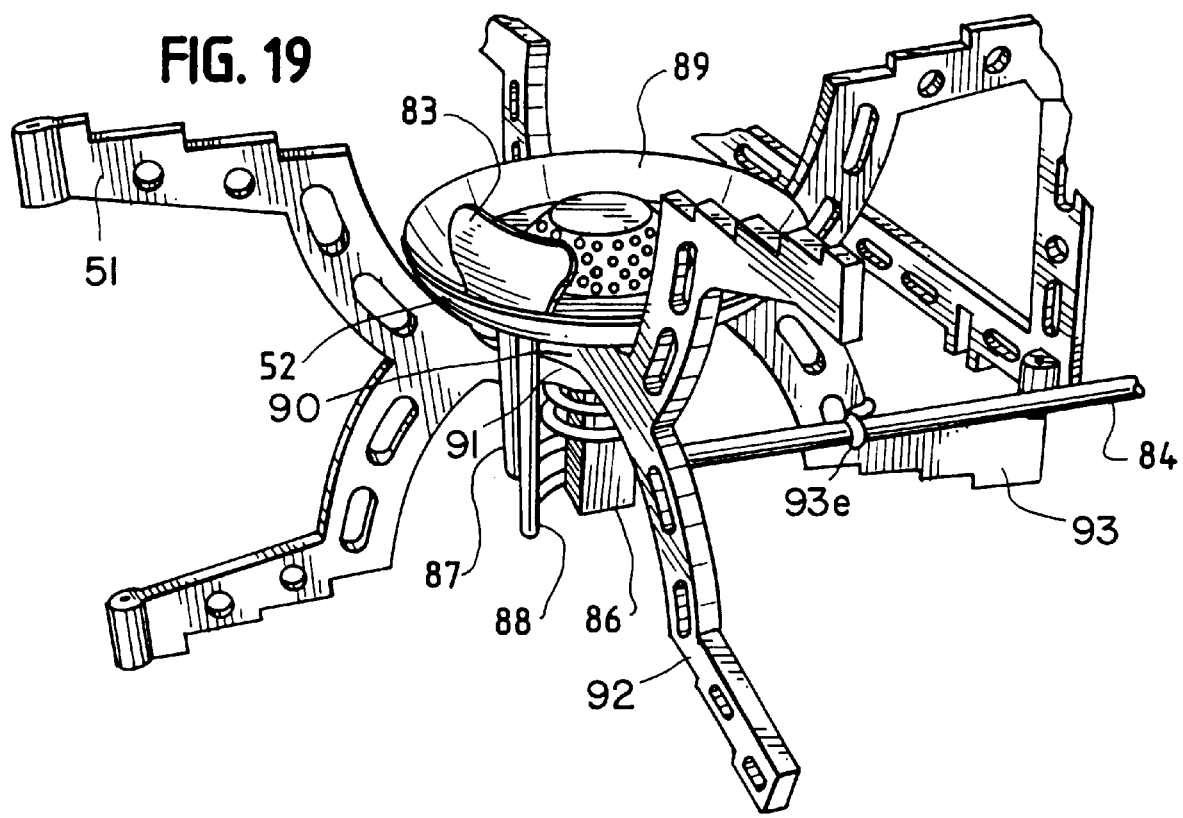
FIG. 19 is a fragmentary perspective view to further illustrate the conduit on the underside of the burner.

The rigid conduits, which extend from the ends of the flexible conduits 78, 79 to where these rigid conduits meet the frame 51, are also partially filled with a solid rod. For example, the flexible conduit 78 connects with a rigid conduit 84. See the central part of FIG. 16. The rigid conduit lies along and is supported by frame member 85. The conduit 84 connects to the burner 52 as seen in FIGS. 16 and 19. In one embodiment, the solid rod in the rigid conduit is brass rodding having an outer diameter of approximately 0.063" (1.6 mm) with the brass tubing having an inner diameter of approximately 0.068" (1.7 mm). The packed brass conduits operate in the same fashion as the packed flexible conduits.

The same structural arrangement applies for the brass (rigid) conduit coupled to the flexible conduit 79 for delivering fuel to the other burner (not shown in FIGS. 16 and 19).

The rigid fuel conduit 84, for example, is connected to a brass block 86 positioned below the burner air inlets (not shown). Fuel is conducted through a passage in the brass block 86 to a generator tube 87 which extends upwardly toward the burner flame zone. The tubular passage then goes through the generator 83 and then downwardly back via tube 88 to the brass block 86. Thereafter, the flow path continues through another passageway in the block 86 upwardly to a conventional orifice. The orifice discharges fuel, now a gas, to a conventional venturi and then the resulting fuel/air mixture flows to the burner for burning. The portion of the generator tube 87, 88 in the flame zone may be provided with a heat sink plate—see the wider or enthickened portion 83 to increase the transfer of heat from the flame to the generator and thereby increase vaporization of fuel in the generator. Alternatively, the top portion of the generator may include a loop to increase the heat transfer area exposed to the flame.

The Frame and Burners

Several of the accompanying figures illustrate a two burner stove. If only one burner 52 is desired, only a single pair of support members 92, 93 need be employed. Unless otherwise noted, the following detailed description of the various features of the collapsible frame applies to both single and multiple burner stoves.

In a preferred embodiment of the collapsible stove as shown in FIGS. 19, 1B, and 1C, a collapsible frame 51 includes two X-shaped support members 92, 93 pivotally attached together at crossover points, or pivots 90, 91, of each support member 92, 93. Extending from each pivot 90, 91 are a pair of opposing support legs 92a, 93a and a pair of opposing support arms 92b, 93b.

Figure 21:
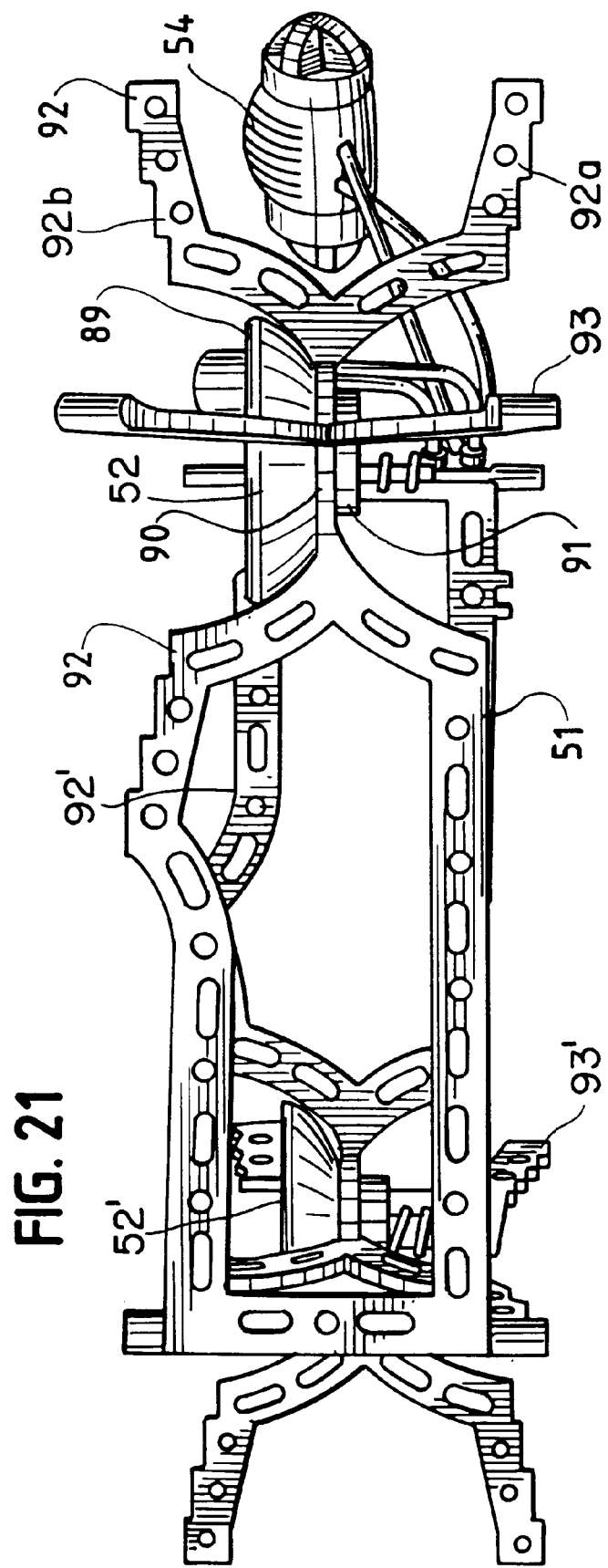
FIG. 21 is yet another fragmentary perspective view of the FIG. 1A stove and oriented so as to particularly show the pivots under the burners.
Figure 22:
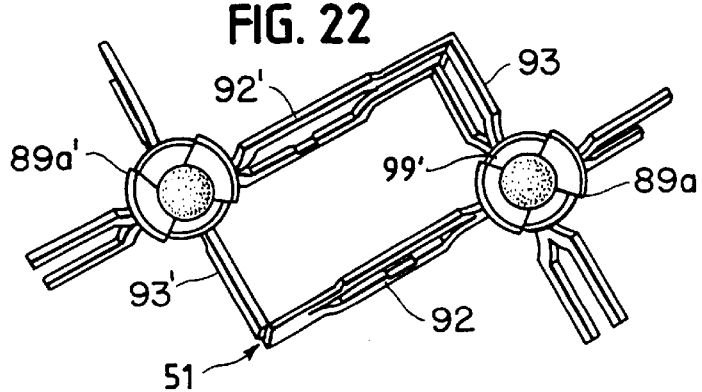
FIG. 22 is a perspective view illustrating the foldability of the appliance frame.
Figure 23:
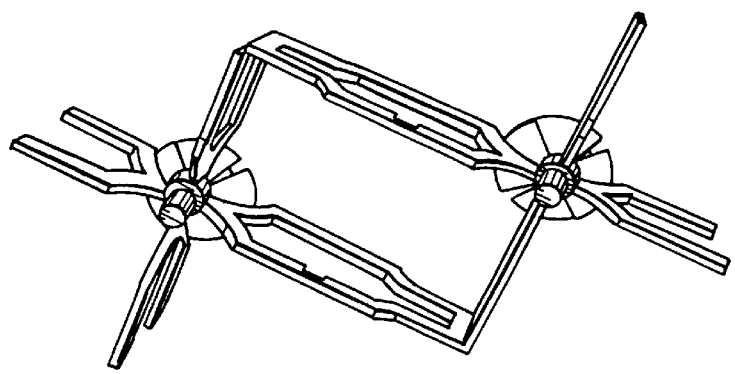
FIG. 23 is a rear perspective view of the embodiment of FIG. 22.
Figure 24:
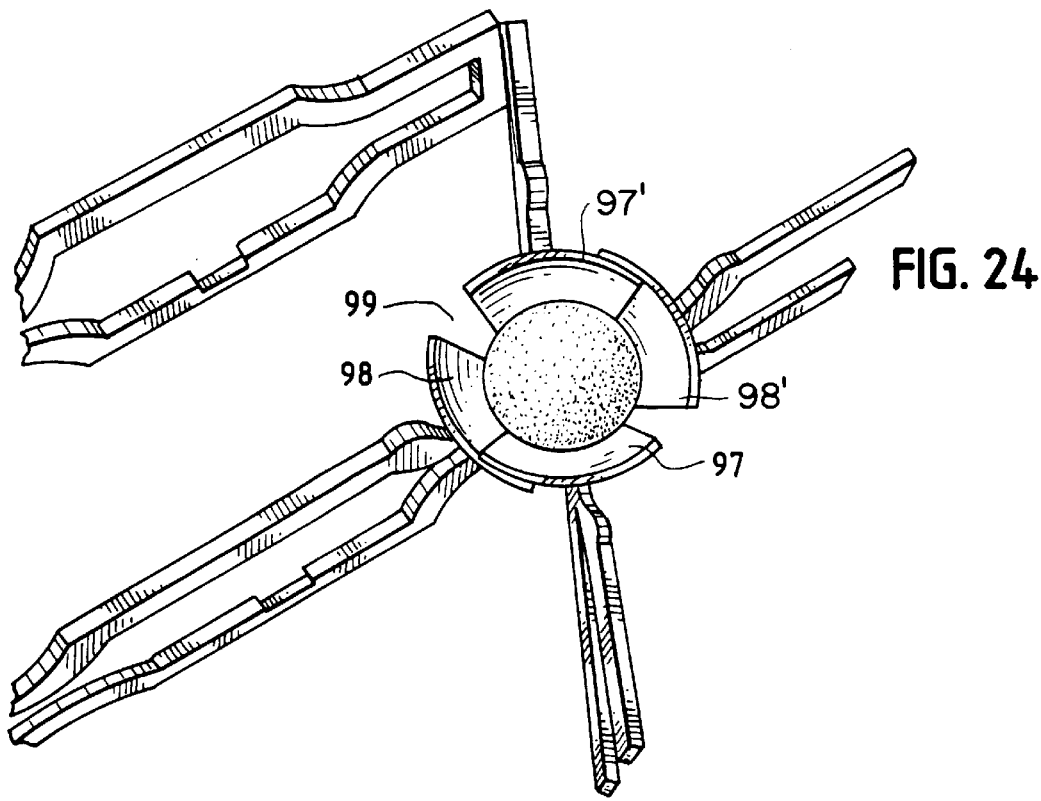
FIG. 24 is an enlarged fragmentary perspective view of the right hand end portion of the embodiment of FIG. 22 and with folding just started as can be appreciated from the gap between adjacent segments making up the bowl-like wind screen of the burner.
Figure 25:
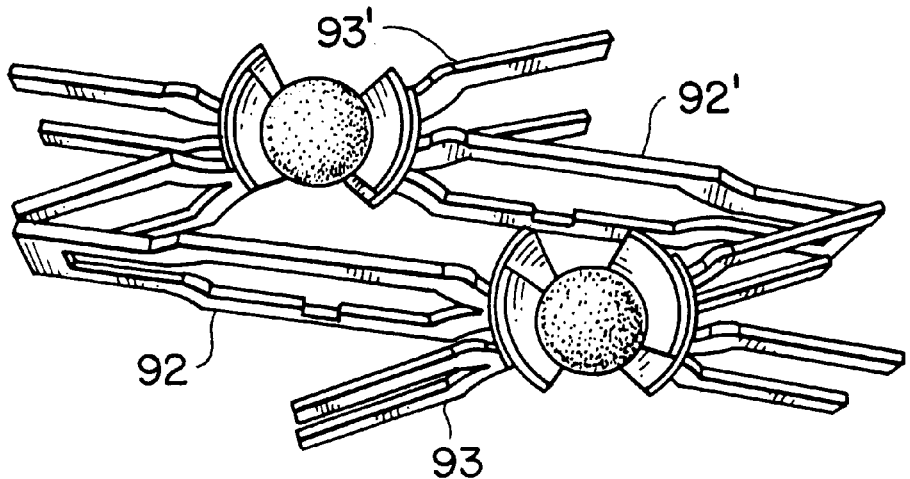
FIG. 25 is a view of the embodiment of FIG. 22 almost completely collapsed.

Referring to FIGS. 21 and 1C, each X-shaped support member 92, 93 has a pivot 90, 91, shown here as an annular hub, through which a portion of a burner assembly 52a extends. In the embodiment shown, the burner assembly 52a serves as a pivot axis, about which one support member 92 pivots. A rigid fuel conduit 84, mounted on the other support member 93, prevents the other support member 93 from pivoting about the burner assembly 52a. However, if the rigid fuel conduit 84 were not mounted on the support member 93, both support members 92, 93 could pivot about the burner assembly 52a. Although in the present embodiment both support members are (or potentially are) pivotally attached to the burner assembly 52a, a similar collapsible frame could be constructed by fixedly attaching a first support member to the burner assembly, and pivotally attaching a second support member to either the burner assembly or the first support member.

Pivots 90, 91 of support members 92, 93 each include a rotation limiter 90a, 91a. As illustrated in FIG. 1C, the rotation limiter 90a, on the uppermost support member 92, extends downwardly. The rotation limiter 91a, on the lowermost support member 93, extends upwardly. Each rotation limiter 90a, 91a is positioned along the outer circumference of the respective pivot 90, 91 so that when the frame 51 is in the operating configuration, the rotation limiter 90a, 91a of each support member 92, 93 abuts against the other support member 93, 92. Accordingly, the rotation limiters 90a, 91a restrict the amount that the support members 92, 93 can pivot relative to one another. In a preferred embodiment, the rotation limiters 90a, 91a permit the support members 92, 93 to pivot approximately 90° relative to one another.

Figure 20:
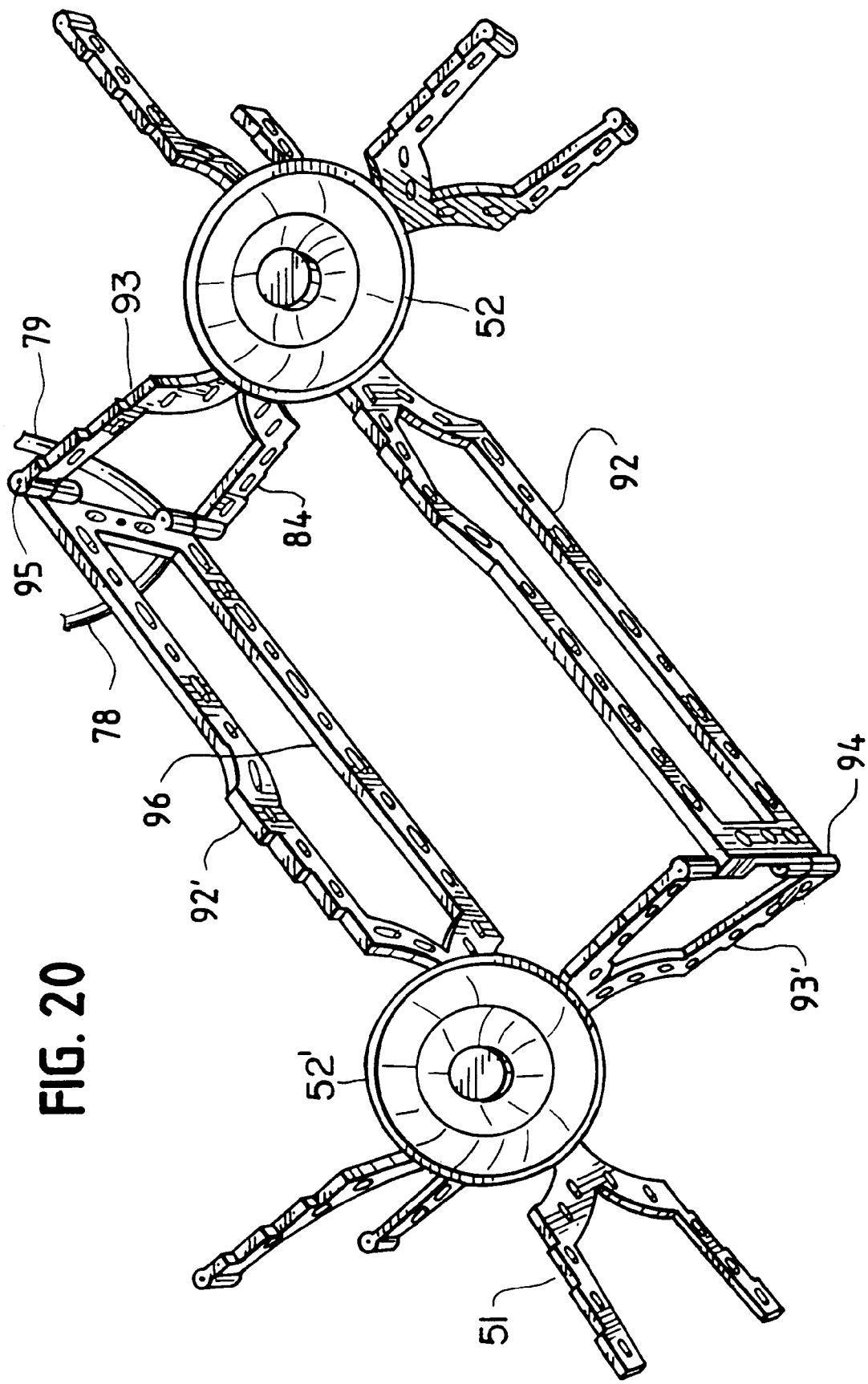
FIG. 20 is still another fragmentary perspective view of the stove of FIG. 1 and oriented so as to show the pivot corners of the pivotally collapsible frame.

By integrating two or more frames of the above-described type, additional burners can be accommodated. For example, in the two burner embodiment shown in FIGS. 1A, 20, and 21, two pairs of pivotally connected X-shaped support members 92, 93, 92', 93' are arranged in quadrilateral relation to provide burners 52, 52' at two opposing corners and pivots at the other two "non-burner" corners 94, 95. Reference to FIG. 20 (and also FIG. 1A) reveals that the two burner frame 51 is generally rectangular when uncollapsed. In this uncollapsed or operating configuration, the support members 92, 93, 92', 93' cooperate to provide a stable base for the stove 50. In a collapsed configuration, shown in FIG. 2, in which the support members 92, 93, 92', 93' are juxtaposed in a compact arrangement, the frame 51 has a narrow elongated shape that is suitable for transport in a backpack or the like. The compactness of the frame 51 can be appreciated from the sequence of views in FIGS. 22 through 26. Opposing support members 92 and 92', 93 and 93' remain substantially parallel to one another as the frame moves between the operating and collapsed configurations.

In the single burner embodiment, the support legs 92a, 93a and support arms 92b, 93b are of equal length. See FIGS. 1B and 1C. In the two burner embodiment, a support leg 92a, 92a' and corresponding support arm 92b, 92b' of two opposing support members 92, 92' have an extended portion, the distal end of which is attached with a pivot pin to a corresponding portion of an adjacent support member 93', 93. See FIG. 20. However, a two burner collapsible frame could have support members 92, 93, 92', 93' all of equal length. Likewise, a single burner collapsible frame could have support members 92, 93 of unequal length.

Advantageously, the support members may be constructed of lightweight metal, preferably magnesium alloy or aluminum alloy. However, depending upon usage and other physical conditions, other materials may be suitably employed. As shown in FIGS. 1A and 2, to further reduce the weight of the frame 51, material may be removed from the inside of the support members by reducing the thickness or creating through-holes in the support arms and legs. The support members can be formed by any conventional means, and are preferably formed by die casting.

In the operating configuration, the support arms 92b, 93b cooperate to form a cooking utensil support. As shown in FIG. 1A, each support arm 92b, 93b has a series of steps 100 to optimally support pots, pans, or other cooking utensils. The steps 100 increase in height above the ground or other support surface as they are located farther from the pivot center 90, 91 of the frame 51. Also, the steps 100 may slope down toward the pivot center 90, 91, i.e., the center of the pot, pan, vessel or other cooking utensil, to provide greater stability. In the illustration given, four steps 100 are provided to accommodate different size pots, pans, vessels or other cookery utensils. However, fewer or more steps can be provided depending on the intended application of the stove. The steps shown in this embodiment are merely for purposes of illustration. Equivalently, the steps could be a series of raised bumps on the support arms or a series of notches formed in the support arms. Those skilled in the art will appreciate the various other possible configurations of steps.

Figure 27:
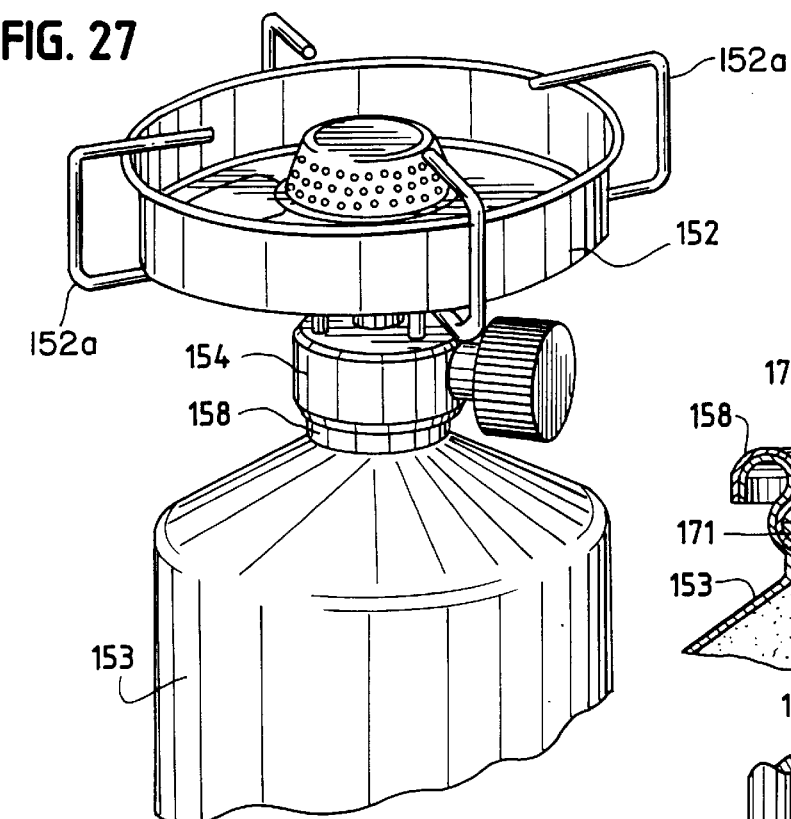
FIG. 27 is a fragmentary perspective view of another embodiment of the invention—this featuring a stove with a single burner.

In a preferred embodiment, rather than integrally forming steps on the support members, grate wires similar to wires 152a shown in FIG. 27 are employed. FIGS. 1B and 1C illustrate how such grate wires 92c, 93c are mounted on the support members 92, 93. Each grate wire slopes toward the center of the stove and has a series of spaced notches 92d, 93d formed therein for stabilizing cooking utensils of different sizes. The grate wires preferably are constructed of stainless steel. Alternatively, the grate wires can be formed of plated steel, or other materials capable of withstanding the high temperatures encountered during use. The grate wires are mounted to the support members by pressing, crimping, pinning, bonding or other attachment techniques. By using grate wires in this manner, less heat is conducted to the frame than when the support members directly support a cooking utensil. This is especially advantageous when the support members are formed of a highly heat-conductive material such as an aluminum or magnesium alloy.

In the single burner embodiment, a rigid fuel conduit 84 rests against one support leg 93a of the burner frame 51. A bracket 93e extends from the support leg 93a to hold the rigid fuel conduit 84 against the support leg 93a. See FIGS. 19 and 1C. In the two burner embodiment, "non-burner" corner 95 serves as the entry of the flexible fuel conduits 78, 79. A bracket 92e' on one extended support leg 92a' holds a rigid fuel conduit 96 for burner 52'. A bracket 93e on the adjacent support leg 93a, which is pivotally attached to the extended support leg 92a', holds another rigid fuel conduit 84 for burner 52. With the two burner frame 51 is folded into a relatively compact or "flat" configuration, the rigid fuel conduits 84, 96 are substantially parallel, with their ends remote from the burner assemblies 52a, 52a' protruding slightly from the folded frame 51. This arrangement permits the flexible fuel conduits 78, 79 and the valve assembly 54 to fold over the collapsed frame 51 for compact storage.

The burner 52 of FIG. 1A is equipped with a 360° unitary, bowl-shaped wind screen 89. See also FIGS. 19 and 21. The wind screen is positioned between the burner 52 and the support member pivots 90, 91. See FIGS. 20, 21, and 1C.

Figure 26:
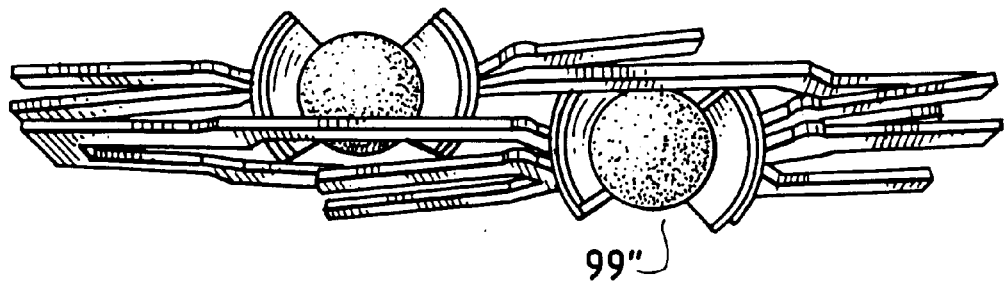
FIG. 26 is a view of the final stage of folding as can be appreciated by the almost total stacking of one bowl segment on the other.

Alternatively, the burner 52 may be equipped with a segmented, bowl-shaped wind screen 89a. See FIGS. 2 and 22 through 26. The wind screen 89a is constructed of four curved segments 97, 98, 97', 98', or quadrants, each of which is attached to an appropriate support member. In accordance with this arrangement, each wind screen segment can rotate with a respective support member to provide a compact storage configuration. Rather than attaching each wind screen segment to an appropriate support member, another arrangement may have an opposing pair of segments attached to one support member, and the other opposing pair of segments attached to the burner assembly itself. The general compactness of the frame and wind screen can be appreciated from the sequence of views shown in FIGS. 22 through 26. In FIG. 26, the wind screen segments are virtually completely stacked, or overlapping, i.e., each upper segment 97, 97' almost eclipses the associated lower segment 98, 98'. In the operating configuration shown in FIG. 22, the gap 99' between the upper and lower segments 97, 98 is virtually nonexistent. At a preliminary stage of folding shown in FIG. 24, there is a gap 99 of about 20°. In the completely collapsed configuration shown in FIG. 26, the gap 99" is almost 90°.

In order to properly position the support members 92, 93 relative to the burner assembly 52a, a helical spring 52b is provided on the burner assembly 52a below the support members 92, 93. The spring 52b urges the support members 92, 93 toward the underside of the burner 52.

Understandably, the wind screen 89 tends to become hot when the stove is operated. To reduce the heat transferred from the windscreen 89 to the support members 92, 93, a "corrugated" washer 52c may be interposed between the windscreen 89 and the uppermost support member 92. See FIG. 1C. The "waves" in the washer 52c reduce the surface contact and consequently the heat transferred from the windscreen 89 to the support members 92, 93. Other devices or arrangements, such as an insulative washer formed of heat insulating material can be used to reduce the transfer of heat from the wind screen to the support members.

Second Connector Embodiment

Figure 28:
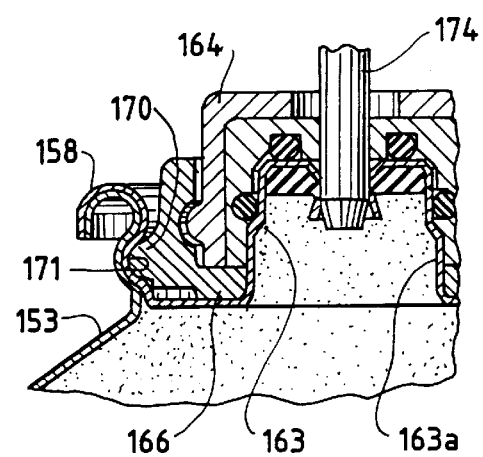
FIG. 28 is a view similar to FIG. 13 featuring a second embodiment of the connector.
Figure 29:
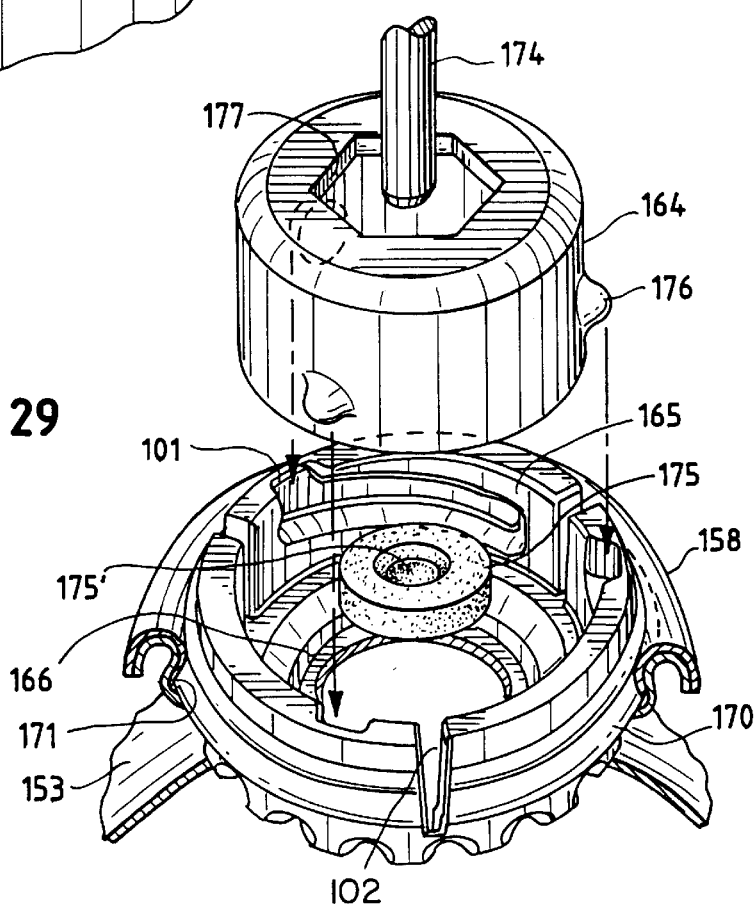
FIG. 29 is a fragmentary exploded perspective view of the connector of FIG. 28.
Figure 34A:
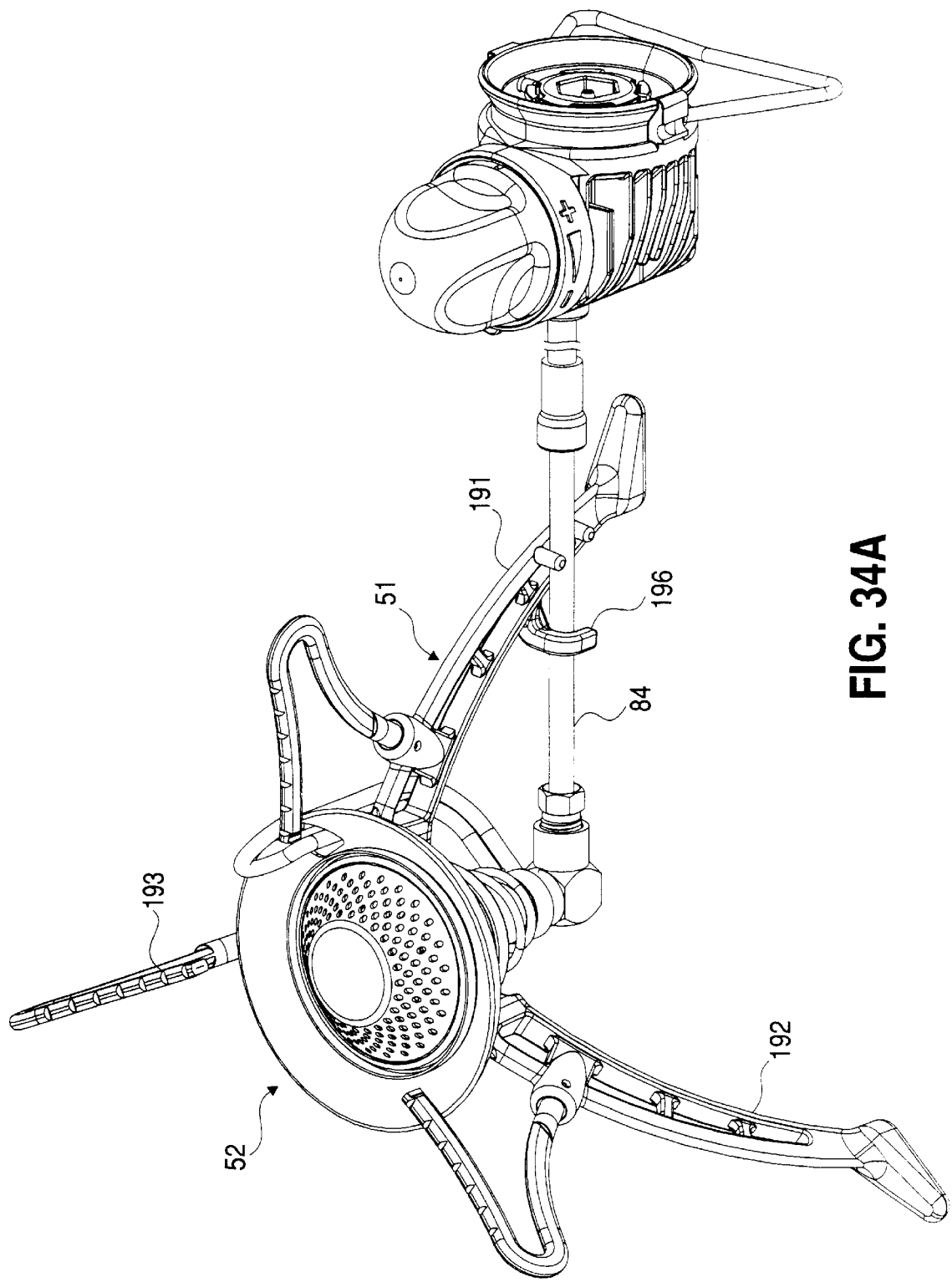
FIG. 34A is a perspective view of an embodiment of the collapsible camp stove frame of the present invention.
Figure 34B:
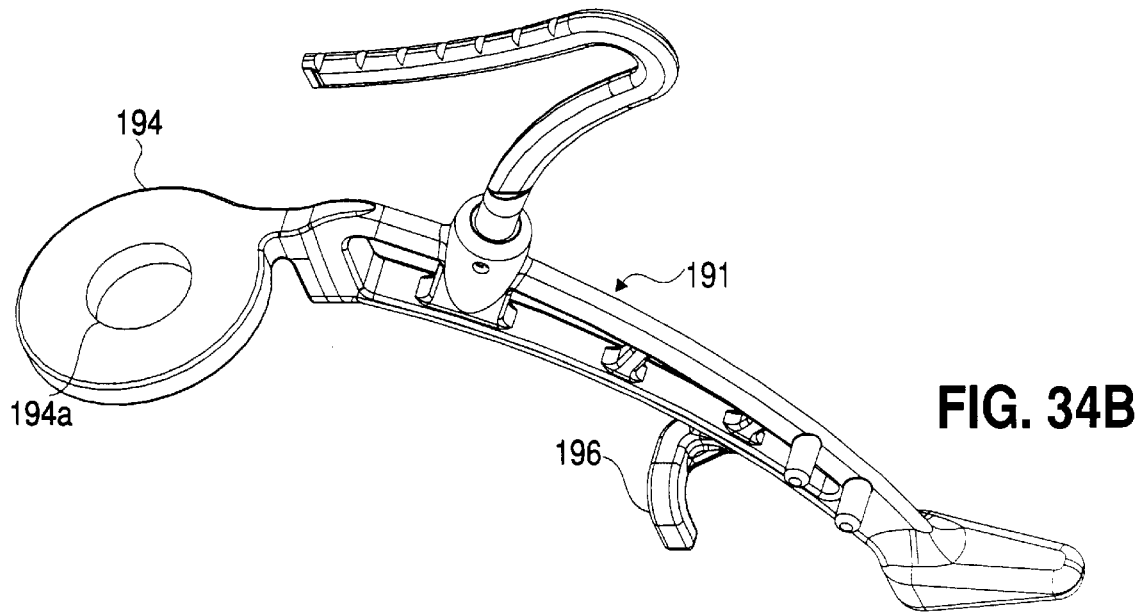
FIGS. 34B through 34D are perspective views of the support legs of the embodiment shown in FIG. 34A.
Figure 34C:
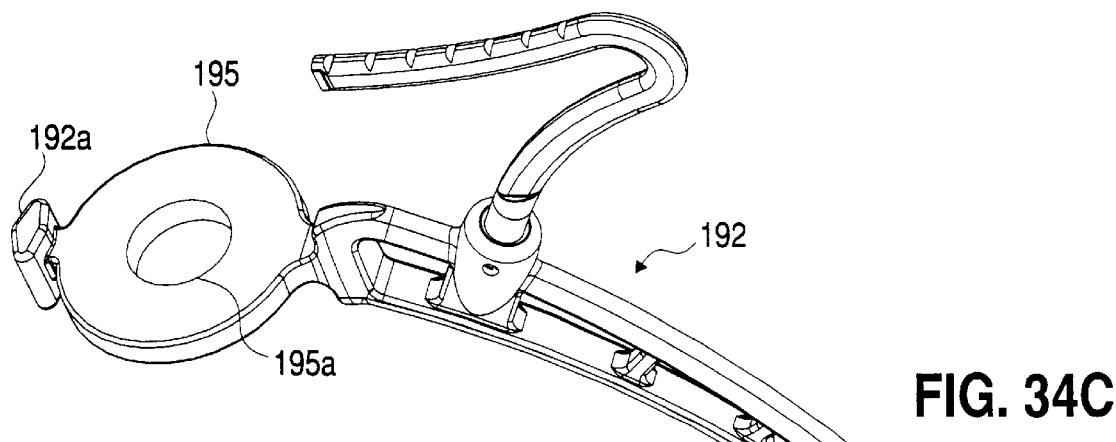
Figure 34D:
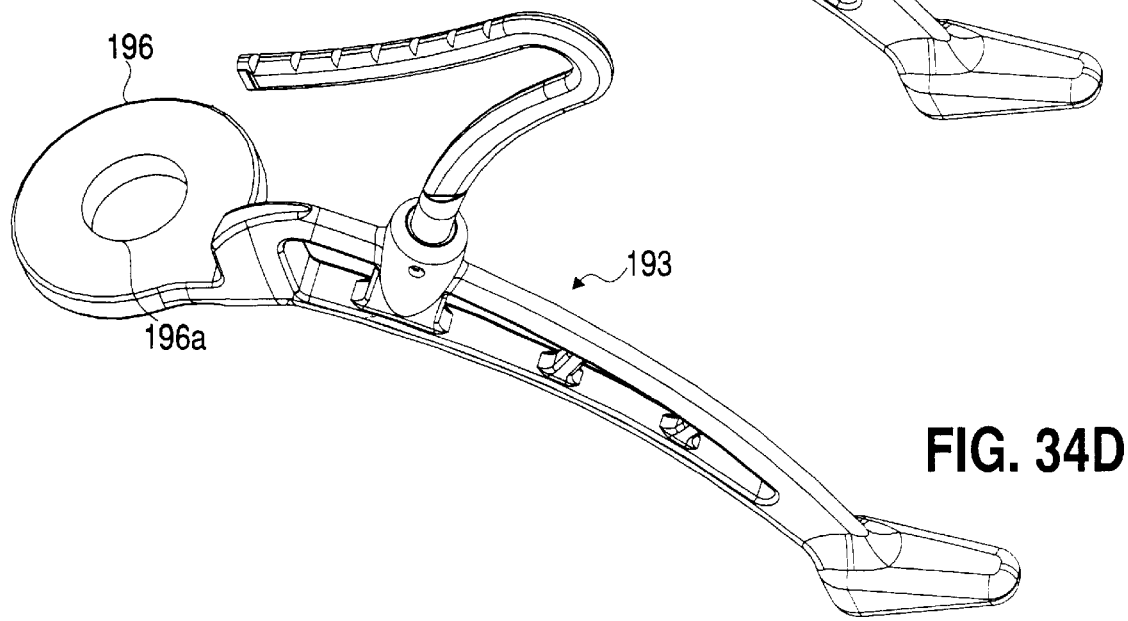

Reference is now made to FIGS. 27 through 29. At the outset it will be understood that this embodiment may be used with either circular or noncircular cylindrical pedestals. Two alternative features of the invention are illustrated. First, in FIG. 27, there is a single burner form of camp stove—seen mounted directly on the canister 153, i.e., without the interposition of flexible conduit means. However, conduit means are provided as part of a valve assembly 154, which advantageously provide the promotion of vaporization of the conduits, etc., of the first described embodiment.

The burner 152 is equipped with U-shaped supports for supporting a pot, pan, vessel, cooking utensil or the like. The canister 153 is equipped with a cap 158. See also FIG. 28. Positioned immediately above the cap 158 is the valve assembly 154. The burner 152 is rigidly carried by the valve assembly 154. What is especially novel and advantageous is the connection between the valve assembly 154 and the cap 158.

This embodiment also employs a collet-type member 166—better seen in FIG. 29—and a cam member 164 also seen in perspective in FIG. 29. The cam member 164 also has associated therewith the probe 174—carried by the valve assembly 154 in fixed relation to the cam member 164 which is also rigidly mounted on the valve assembly 154.

Differing from the first embodiment is the fact that the collet member 166 is provided as part of the cap 158. The cap 158 again has the inwardly facing annular or circumferential groove 171 into which an annular rib 170 (corresponding to the pawls 70 of the first embodiment) provided on the collet 166 is received.

As the cam member 164 is brought toward engagement with the collet member 166 carried by the cap 158—the condition depicted in FIG. 29—the radially outwardly extending lugs 176 on the pan member 164 are aligned with the open ends of the L-shaped slots 101 provided in the fingers 165. These fingers 165 in collet-like fashion are separated by axially-extending slots or separations 101.

As the lugs 176 engage the L-shaped slots 101, they follow the slot contour as the canister 153 is rotated. Again, the canister is provided with a stepped pedestal 163 where the lower step 163a is non-circular. Again, in the illustration given, a hexagonal shape is employed—to match opening 177 in the cam member 164. As the canister is rotated relative to the valve assembly, or vice versa, the lugs 176 move further down the L-shaped slots 101 which become shallower—developing a more secure seat of the cam member 164 (and therefore the valve assembly 154) in the collet member 166 (and therefore the cap 158 of the canister 153). This results in two advantageous functions. First, the fingers 165 are forced outwardly—further seating the annular rib 170 in the annular recess 171. Second, this brings the probe 174 downwardly through the web 175—more particularly, the orifice 175'—to effectuate a secure seal.

Third Connector Embodiment

The third embodiment is seen in FIGS. 30 through 32. At the outset it will be understood that this embodiment also may be used with either circular or noncircular cylindrical pedestals. This embodiment has the collet and cap combined and also provides the same vaporization promoting operation downstream of the canister.

In each of FIGS. 30 and 31, reference numeral 253 designates the canister equipped with a rolled-on cap 258. The cap is equipped with a centrally apertured boss 263 somewhat akin to the pedestal of the preceding embodiments. The boss 263 has fitted therein a seal 275 having a recessed thinner area 275'. This is engaged by the probe 274 provided as part of the lower housing 264 of the valve assembly generally designated 254. Seen only in FIG. 30.

The lower housing 264 is equipped with a pair of opposed lugs 276 which are engageable with a pair of opposed ramped slots 201. As the lugs enter the slots, relative turning movement (e.g., a ¼ turn) of the valve assembly and canister cap results in the parts being pulled together, the probe 274 rupturing the thin web 275' and the lugs being temporarily locked by the detent 202 adjacent to, but spaced from, the lower end of each slot 201. This results in the two parts, i.e., canister cap 258 and valve assembly 254, remaining connected. And when disconnection is indicated, all that is required is a reverse ¼ turn, for example.

To provide a greater engagement or entry of the lower housing into the cap, the modification of FIG. 32 may be employed. There, all the parts are the same except the vertical wall of the cap is lengthened and has a rolled top—as at 258'. Also, the ramped slot is different. In FIG. 32, the slot 201' is seen to have its upper terminus in the rolled upper edge of the cap, rather than the flared upper edge of the FIG. 31 embodiment. In either event, the same advantageous operation relative to promoting flow path vaporization is available.

Alternate Frame Embodiment

FIGS. 34A through 34D illustrate another embodiment of the stove frame 51, which includes three pivotally connected support legs 191, 192, 193. The legs 191, 192, 193 extend, respectively, from annular pivots 194, 195, 196 with openings 194a, 194b, 194c, through which the burner assembly 52 is secured. Support leg 191 includes a bracket 196, which is provided to hold the rigid fuel conduit 84 against the support leg 191, essentially fixing the support leg 191 to the burner assembly.

In order to facilitate collapsibility of the frame 51, the support leg 192 extends approximately radially from the annular pivot 195, while support legs 191, 193 are askew relative to the annular pivots 194, 196, respectively. The support legs 191, 193 are offset from the annular pivots 194, 196 in opposite directions. That is, when viewed from above with the support legs 191, 193 oriented similarly, annular pivot 194 will be offset to one side of support leg 191, while annular pivot 196 will be offset to the other side of the support leg 193. In the embodiment shown, when the frame 51 is assembled, annular pivot 194 is stacked on top of annular pivot 195, which is, in turn, stacked on top of annular pivot 196. A rotation limiter 192a (discussed below) on support leg 192, prevents the support legs 191, 193 from pivoting beyond a certain degree away from the support leg 192. This permits the legs to be collapsed against one another in only one direction. Thus, when the frame 51 is collapsed, support legs 191, 193 lie closely against opposite sides of support leg 192.

Support legs 191, 193 are also offset vertically relative to annular pivots 194, 196, respectively. When viewed from the side, annular pivot 194 extends from a higher point on support leg 191 than does annular pivot 195 from support leg 192, which is in turn higher than annular pivot 196 is relative to support leg 193. This permits the legs 191, 192, 193 to be at a substantially common height when the annular pivots 194, 195, 196 are stacked when the frame 51 is assembled.

The rotation limiter 192a extends from annular pivot 195 opposite the support leg 192. This limiter 192a extends above and below annular pivot 195, and is dimensioned to contact each of the other support legs 191, 193 when they are pivoted approximately 120° away from support leg 192. This defines a fully-open position, shown in FIG. 34A, in which the support legs 191, 192, 193 are approximately evenly distributed about the burner assembly 52. Because the support legs 191, 193 are offset relative to annular pivots 194, 196, respectively, the limiter 192 can be relatively small and still maintain the separation between these support legs 191, 193. In the embodiment shown, for example, the annular pivot 195 has an outer radius of approximately 0.60", and the limiter 192a is only approximately 0.37" across its widest portion, which is approximately 0.70" from the center of the pivot 195. It is not necessary that the stove be designed so that the support legs 191, 192, 193 will be evenly separated when the stove is fully open. Any desired separation can be achieved by altering the size and location of the limiter 192a.

One particular advantage of this configuration is the ease with which the frame 51 can be opened and collapsed. From the collapsed position, with the support legs 191, 192, 193 lying closely against one another, a user need only grasp and rotate support leg 193 about the burner (clockwise, when viewed from above, in the illustrated embodiment) away from support leg 191 as far as possible to open the stove. As support leg 193 rotates to approximately 120° away from support leg 192, it will contact the limiter 192a. Further rotation of the support leg 193 in the same direction will force the limiter 192a, and therefore the support leg 192, to rotate in the same direction relative to the support leg 191. This continues until the limiter 192a contacts the support leg 191, at which point the stove will be in the illustrated, fullyopened positioned. To close the stove, support 193 is simply rotated about the burner assembly 52 in the opposite direction (counterclockwise, when viewed from above, in the embodiment shown).

SUMMARY

The invention of an LPG canister connector for a combustion appliance 52, 52' includes means providing a flow path from a canister 53, 153, 253 containing liquid fuel and having a cap 58, 158, 258 with outlet means at the upstream end of the flow path, a valve assembly 54, 154, 254 adapted to be connected to the cap and equipped with conduit means adapted to be connected to a combustion appliance 52, 52', 152 at the downstream end of the flow path, the flow path means being equipped with means for promoting vaporization of the fuel intermediate the ends of the flow path.

The vaporization promoting means may take a variety of forms. For example, the most upstream position for this to occur is in the valve assembly 54, 154, 254. In addition to the aluminum or other metal body which makes up the valve assembly, other heat sink producing structures may be employed such as the fins 69.

Another example of the vaporization promoting means are the flexible and rigid conduits. By "packing" them, it is reasonably convenient to achieve a large heat absorbing surface and a reduction of volume in the flow path downstream of the canister, viz., lower flow rates.

Still further, the use of metal in junctions, particularly when flow directions change, can be helpful in promoting vaporization of the last vestiges of liquid. Exemplary of this are the block 86 and the generator 83.

The invention, as indicated above, finds use in connection with lanterns—particularly the mantle type which operates advantageously on liquid fuel. There, we interpose thermal insulation in the flow path between the generator and the burner tip or jet. This promotes vaporization prior to the burner in a configuration generally like that of FIG. 27. A suitable burner for the lantern and the other embodiments hereof can be seen in British Patent 2 262 157B.

While in the foregoing specification a detailed description of embodiments of the invention have been set down for the purpose of illustration and compliance with the statute, many variations in the details herein given may be made by those skilled in the art without departing from the spirit and scope of the invention as defined by the following claims.

We claim:

1. A connector for securing a conduit to a fluid source, which source includes (i) a noncircular, cylindrical pedestal having a fluid source outlet extending therethrough and (ii) an annular groove surrounding the pedestal, the connector comprising:

an inlet port engageable with the fluid source outlet;

an outlet port in fluid communication with the inlet port and engageable with the conduit;

a collet comprising (i) a base, and (ii) a plurality of fingers extending from the base substantially parallel to an axis of the inlet port, each finger being disposed a common radial distance from the axis of the inlet port and including a radially extending pawl spaced from the base; and an annular cam having a noncircular, cylindrical receptacle correspondingly engageable with the noncircular, cylindrical pedestal of the fluid source and having an axis coincident with the axis of the inlet port, the cam being seated within the collet and disposed to rotate about the coincident axes, so that when the pedestal is engaged with the receptacle, rotation of the pedestal causes the cam to rotate, the cam including a contact surface which, when the cam is rotated by rotation of the pedestal, abuts the fingers of the collet and forces the pawls away from the coincident axes into the annular groove to secure the conduit to the fluid source.

2. The connector of claim 1, wherein the contact surface of the cam comprises a series of radially extending lugs.

3. The connector of claim 1, wherein the cam and the collet are correspondingly threaded, and each finger of the collet further comprises an inwardly extending pawl, so that rotation of the cam in one direction relative to the collet causes the cam to move axially relative to the collet causing the contact surface to abut the inwardly extending pawl.

4. The connector of claim 1, wherein one of the contact surface of the cam and the fingers of the collet includes a rib, and the other of the contact surface and the fingers includes a groove configured to receive the rib.

5. The connector of claim 1, wherein the noncircular, cylindrical pedestal of the fluid source and the noncircular, cylindrical receptacle of the cam have a hexagonal shape.

6. The connector of claim 1, wherein the one of the contact surface of the cam and the fingers of the collet is tapered.

7. The connector of claim 1, wherein the fingers are spaced substantially equally circumferentially about the coincident axes.

8. A connector for securing a conduit to a fluid source, which source includes (i) a pedestal having a fluid source outlet extending therethrough and (ii) a cap having an inwardly formed annular groove surrounding the pedestal, the connector comprising:

an inlet port engageable with the fluid source outlet;

an outlet port in fluid communication with the inlet port and engageable with the conduit;

a collet adapted to be received within the cap, said collet including (i) a base, and (ii) a plurality of fingers extending from the base substantially parallel to an axis of the inlet port, each finger being disposed a common radial distance from the axis of the inlet port and including a slot formed on an inside perimeter surface of each of the fingers and an annular rib formed on an outside perimeter surface of each of the fingers, the rib being received in the annular groove; and an annular cam having a receptacle correspondingly engageable with the pedestal of the fluid source and having an axis coincident with the axis of the inlet port, the cam being seated within the collet and disposed to rotate about the coincident axes, so that when the pedestal is engaged with the receptacle, rotation of the pedestal causes the cam to rotate, the cam including a plurality of spaced projections formed on an outside perimeter surface of the cam, wherein when the cam is rotated by rotation of the pedestal, each of the plurality of projections enters a respective one of the slots formed in the collet and forces the ribs into the annular grooves to secure the conduit to the fluid source.

9. The connector of claim 8, wherein the projections comprise a plurality of radially extending lugs.

10. The connector of claim 9, wherein the lugs are spaced substantially equally circumferentially about the coincident axis.

11. The connector of claim 8, wherein the projections comprise a plurality of radially dome-shaped projections.

12. The connector of claim 11, wherein the dome-shaped projections are spaced substantially equally circumferentially about the coincident axis.

13. The connector of claim 8, wherein the pedestal of the fluid source and the receptacle of the cam have a circular cylindrical shape.

14. The connector of claim 8, wherein the pedestal of the fluid source and the receptacle of the cam have a noncircular, cylindrical shape.

15. The connector of claim 8, wherein one of the contact surface of the cam and the fingers of the collet is tapered.

16. The connector of claim 8, wherein the fingers are spaced substantially equally circumferentially about the coincident axes.

17. A method of securing a pedestal to a cam/collet mechanism, the method comprising the steps of:

inserting a noncircular, cylindrical pedestal into a noncircular, cylindrical receptacle of an annular cam;

rotating simultaneously the pedestal and the cam relative to a collet in which the cam is seated so that the cam forces a plurality of pawls on the collet into an annular groove surrounding the pedestal to secure the pedestal to the cam/collet mechanism.

18. A method of securing a pedestal to a cam/collet mechanism, the method comprising the steps of:

inserting a hexagonal cylindrical pedestal into a hexagonal cylindrical receptacle of an annular cam;

rotating simultaneously the pedestal and the cam relative to a collet in which the cam is seated so that a plurality of lugs on the cam abut against a plurality of fingers on the collet forcing a pawl on each finger into an annular groove surrounding the pedestal to secure the pedestal to the cam/collet mechanism.

* * * * *